(12) United States Patent
Awada et al.

(10) Patent No.: US 12,745,201 B2
(45) Date of Patent: Sep. 22, 2026

(54) TIMING ADVANCE VALIDITY MANAGEMENT IN MULTI-CELL ACCESS NETWORKS

(71) Applicant: Nokia Technologies Oy, Espoo (FI)

(72) Inventors: Ahmad Awada, Munich (DE); Sanjay Goyal, Murray Hill, NJ (US); Ali Karimidehkordi, Munich (DE); Bernhard Wegmann, Munich (DE); Ugur Baran Elmali, Munich (DE); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 390 days.

(21) Appl. No.: 18/440,406

(22) Filed: Feb. 13, 2024

(65) Prior Publication Data

US 2024/0284369 A1 Aug. 22, 2024

(30) Foreign Application Priority Data

Feb. 17, 2023 (GB) ..................................... 2302279

(51) Int. Cl.
*H04W 56/00* (2009.01)
*H04B 17/318* (2015.01)
(Continued)

(52) U.S. Cl.
CPC ...... *H04W 56/0045* (2013.01); *H04B 17/328* (2023.05); *H04W 24/10* (2013.01); *H04W 76/10* (2018.02)

(58) Field of Classification Search
CPC . H04W 56/0045; H04W 24/10; H04W 76/10; H04W 56/0015; H04W 36/0005;
(Continued)

(56) References Cited

U.S. PATENT DOCUMENTS

2013/0100938 A1 4/2013 Kwon et al.
2015/0085839 A1* 3/2015 Bergstrom ........ H04W 56/0045 370/336

(Continued)

FOREIGN PATENT DOCUMENTS

WO 2018/028637 A1 2/2018
WO 2018/166471 A1 9/2018

(Continued)

OTHER PUBLICATIONS

U.S. Appl. No. 63/445,694, filed Feb. 14, 2023 (Year: 2023).*

(Continued)

*Primary Examiner* — Sun Jong Kim
(74) *Attorney, Agent, or Firm* — Barta Jones, PLLC

(57) ABSTRACT

There is provided a method, computer program, and apparatus for causing an apparatus for a first access node to perform: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the second access node, an indication that the first timing advance value is or will soon be invalid; and determining whether to instruct the user equipment to obtain a second timing advance value for the target cell in dependence on the received indication, the second timing advance value being obtained later in time than the first timing advance value.

16 Claims, 10 Drawing Sheets

(51) Int. Cl.
*H04W 24/10* (2009.01)
*H04W 76/10* (2018.01)

(58) Field of Classification Search
CPC .......... H04W 36/0083; H04W 36/0085; H04B 17/328
See application file for complete search history.

(56) References Cited

U.S. PATENT DOCUMENTS

| | | | |
|---|---|---|---|
| 2019/0037453 A1 | 1/2019 | Wang et al. | |
| 2021/0400567 A1 | 12/2021 | Sha et al. | |
| 2022/0038997 A1 | 2/2022 | Hoglund et al. | |
| 2022/0060997 A1* | 2/2022 | Dinan | H04L 69/22 |
| 2022/0240208 A1 | 7/2022 | Chien | |
| 2025/0374134 A1* | 12/2025 | Kim | H04W 36/0072 |

FOREIGN PATENT DOCUMENTS

| | | |
|---|---|---|
| WO | 2020/034571 A1 | 2/2020 |
| WO | 2021/228231 A1 | 11/2021 |
| WO | 2022/035762 A1 | 2/2022 |
| WO | 2022/130207 A1 | 6/2022 |
| WO | 2022/150955 A1 | 7/2022 |
| WO | 2022/237845 A1 | 11/2022 |

OTHER PUBLICATIONS

"3rd Generation Partnership Project; Technical Specification Group Radio Access Network; NG-RAN; F1 application protocol (F1AP) (Release 17)", 3GPP TS 38.473, V17.3.0, Dec. 2022, pp. 1-698.
"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.
"MSC-generator", Sourceforge, Retrieved on May 31, 2024, Webpage available at : https://sourceforge.net/projects/msc-generator/.
"3rd Generation Partnership Project; Technical Specification Group Radio Access Network; NR; Physical channels and modulation (Release 17)", 3GPP TS 38.211, V17.4.0, Dec. 2022, pp. 1-136.
"IEEE 802.11", Wikipedia, Retrieved on May 7, 2024, Webpage available at : https://en.wikipedia.org/wiki/IEEE_802.11.
Search Report received for corresponding United Kingdom Patent Application No. 2302304.7, dated Aug. 25, 2023, 5 pages.
Search Report received for corresponding United Kingdom Patent Application No. 2302279.1, dated Aug. 29, 2023, 3 pages.
"Moderator summary on Timing advance management: Round 1", 3GPP TSG RAN WG1 #110b-e, R1-2210390, Agenda: 9.12.2, CATT, Oct. 10-19, 2022, 10 pages.
Search Report received for corresponding United Kingdom Patent Application No. 2302300.5, dated Aug. 29, 2023, 3 pages.
Search Report received for corresponding United Kingdom Patent Application No. 2302309.6, dated Aug. 29, 2023, 3 pages.
Search Report received for corresponding United Kingdom Patent Application No. 2302313.8, dated Aug. 29, 2023, 3 pages.
International Search Report and Written Opinion received for corresponding Patent Cooperation Treaty Application No. PCT/EP2024/050481, dated Apr. 22, 2024, 16 pages.
"Discussion on timing advance management for L1/L2-triggered mobility", 3GPP TSG RAN WG1 #111, R1-2211307, Agenda: 9.12.2, Nokia, Nov. 14-18, 2022, 8 pages.
"LTM stage-2 design models", 3GPP TSG-RAN2#121, R2-2300220, Agenda: 8.4.2.1, Lenovo, Feb.-Mar. 2023, 5 pages.
"Details of Early TA work", 3GPP TSG-RAN2#121, R2-2300221, Agenda: 8.4.2.3, Lenovo, Feb.-Mar. 2023, 10 pages.
International Search Report and Written Opinion received for corresponding Patent Cooperation Treaty Application No. PCT/EP2024/050479, dated Apr. 29, 2024, 12 pages.
"Discussion on dynamic switch for L1/L2 mobility", 3GPP TSG-RAN WG2 Meeting #119bis-e, R2-2210172, Agenda: 8.4.2.3, ZTE Corporation, Oct. 10-19, 2022, 13 pages.
"Latency Reduction and Target TA Determination for L1/L2 Mobility", 3GPP TSG RAN WG1 Meeting #110bis-e, R1-2208383, Agenda: 9.12.2, Futurewei, Oct. 10-19, 2022, 9 pages.
Extended European Search Report received for corresponding European Patent Application No. 24151271.4, dated Jul. 9, 2024, 13 pages.
"Enhancements on TA management to reduce latency", 3GPP TSG RAN WG1 Meeting #111, R1-2210943, Agenda: 9.12.2, ZTE, Nov. 14-18, 2022, 8 pages.
Extended European Search Report received for corresponding European Patent Application No. 24151270.6, dated Jul. 9, 2024, 11 pages.
Extended European Search Report received for corresponding European Patent Application No. 24151275.5, dated Jul. 12, 2024, 12 pages.

* cited by examiner 100
108
110
N33
124
128
N6
126
N29
114
N4
120
N3
104
118
N10
122
N8
N11
N2
116
112
102
N12
N1
106

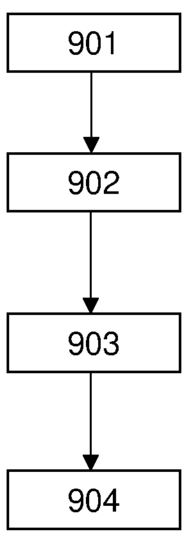
Fig. 9
1001
1002
1003
Fig. 10
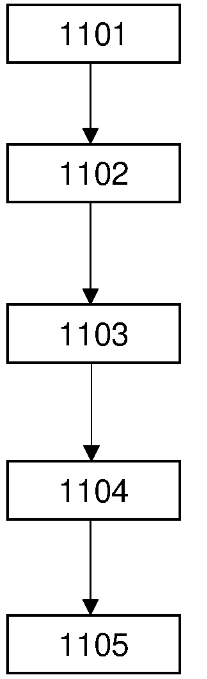
Fig. 11
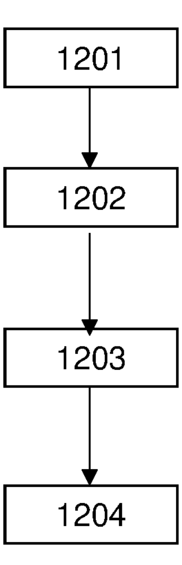
Fig. 12

TIMING ADVANCE VALIDITY MANAGEMENT IN MULTI-CELL ACCESS NETWORKS

FIELD OF THE DISCLOSURE

The examples described herein generally relate to apparatus, methods, and computer programs, and more particularly (but not exclusively) to apparatus, methods and computer programs for apparatuses.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to a first aspect, there is provided an apparatus for a first access node, the apparatus comprising means for performing: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the second access node, an indication that the first timing advance value is or will soon be invalid; and determining whether to instruct the user equipment to obtain a second timing advance value for the target cell in dependence on the received indication, the second timing advance value being obtained later in time than the first timing advance value.

The apparatus may comprise means for receiving, from the user equipment, a first indication of a current strength and/or quality of a signal of the target cell received by the user equipment, wherein the determining whether to instruct the user equipment may comprise: determining to instruct the user equipment to obtain the second timing advance value when the first indication indicates that the current strength and/or quality of the signal provided by the target cell received by the user equipment has increased above a predetermined threshold.

The apparatus may comprise means for receiving, from the user equipment, a first indication of a current strength and/or quality of a signal of the target cell received by the user equipment, wherein the determining whether to instruct the user equipment may comprise: determining to instruct the user equipment to release the first timing advance value when the first indication indicates that the current strength and/or quality of the target cell received by the user equipment is below or equal to a predetermined threshold.

The indication of when the first timing advance value is or will be no longer valid for the user equipment to transmit uplink to the target cell may be received indirectly from the second access node via a centralized unit.

The apparatus may comprise means for signalling a response to the indication that the first timing advance value is or will soon be invalid, the response comprising an indication as to whether the user equipment has been instructed to re-acquire the timing advance of the target cell.

The apparatus may comprise means for receiving, from the user equipment, a first indication of a current strength and/or quality of a signal of the target cell received by the user equipment, wherein the first indication is received in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a second aspect, there is provided an apparatus for a second access node, the apparatus comprising means for performing: causing a first timing advance value to be provided to a user equipment for enabling the user equipment to synchronize uplink transmissions to a timing of a target cell supported by the second access node; determining a validity time of the first timing advance value, wherein, the first timing advance value is considered invalid after the validity time; and signalling, to a first access node supporting a serving cell connected to the user equipment, an indication that the first timing advance value is or will soon be invalid before or on expiry of the validity time.

The apparatus may comprise means for receiving a response to the indication that the first timing advance value is or will soon be invalid, the response comprising an indication as to whether the user equipment has been instructed to re-acquire the timing advance of the target cell.

The response may indicate that the user equipment has been instructed to re-acquire the timing advance of the target cell, and the apparatus may comprise means for causing a second timing advance value to be provided to the user equipment for enabling the user equipment to synchronize uplink transmissions to a timing of a target cell supported by the second access node.

According to a third aspect, there is provided an apparatus for a first access node, the apparatus comprising: at least one processor; and at least one memory comprising software code that, when executed by the at least one processor, causes the apparatus to perform: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the second access node, an indication that the first timing advance value is or will soon be invalid; and determining whether to instruct the user equipment to obtain a second timing advance value for the target cell in dependence on the received indication, the second timing advance value being obtained later in time than the first timing advance value.

The apparatus may be caused to perform receiving, from the user equipment, a first indication of a current strength and/or quality of a signal of the target cell received by the user equipment, wherein the determining whether to instruct the user equipment may comprise: determining to instruct the user equipment to obtain the second timing advance value when the first indication indicates that the current strength and/or quality of the signal provided by the target cell received by the user equipment has increased above a predetermined threshold.

The apparatus may be caused to perform receiving, from the user equipment, a first indication of a current strength and/or quality of a signal of the target cell received by the user equipment, wherein the determining whether to instruct the user equipment may comprise: determining to instruct the user equipment to release the first timing advance value when the first indication indicates that the current strength and/or quality of the target cell received by the user equipment is below or equal to a predetermined threshold.

The indication of when the first timing advance value is or will be no longer valid for the user equipment to transmit uplink to the target cell may be received indirectly from the second access node via a centralized unit.

The apparatus may be caused to perform signalling a response to the indication that the first timing advance value is or will soon be invalid, the response comprising an indication as to whether the user equipment has been instructed to re-acquire the timing advance of the target cell.

The apparatus may be caused to perform receiving, from the user equipment, a first indication of a current strength and/or quality of a signal of the target cell received by the user equipment, wherein the first indication is received in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a fourth aspect, there is provided an apparatus for a second access node, the apparatus comprising: at least one processor; and at least one memory comprising software code that, when executed by the at least one processor, causes the apparatus to perform: causing a first timing advance value to be provided to a user equipment for enabling the user equipment to synchronize uplink transmissions to a timing of a target cell supported by the second access node; determining a validity time of the first timing advance value, wherein, the first timing advance value is considered invalid after the validity time; and signalling, to a first access node supporting a serving cell connected to the user equipment, an indication that the first timing advance value is or will soon be invalid before or on expiry of the validity time.

The apparatus may be caused to perform receiving a response to the indication that the first timing advance value is or will soon be invalid, the response comprising an indication as to whether the user equipment has been instructed to re-acquire the timing advance of the target cell.

The response may indicate that the user equipment has been instructed to re-acquire the timing advance of the target cell, and the apparatus may be caused to perform causing a second timing advance value to be provided to the user equipment for enabling the user equipment to synchronize uplink transmissions to a timing of a target cell supported by the second access node.

According to a fifth aspect, there is provided a method for an apparatus for a first access node, the method comprising: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the second access node, an indication that the first timing advance value is or will soon be invalid; and determining whether to instruct the user equipment to obtain a second timing advance value for the target cell in dependence on the received indication, the second timing advance value being obtained later in time than the first timing advance value.

The method may comprise receiving, from the user equipment, a first indication of a current strength and/or quality of a signal of the target cell received by the user equipment, wherein the determining whether to instruct the user equipment may comprise: determining to instruct the user equipment to obtain the second timing advance value when the first indication indicates that the current strength and/or quality of the signal provided by the target cell received by the user equipment has increased above a predetermined threshold.

The method may comprise receiving, from the user equipment, a first indication of a current strength and/or quality of a signal of the target cell received by the user equipment, wherein the determining whether to instruct the user equipment may comprise: determining to instruct the user equipment to release the first timing advance value when the first indication indicates that the current strength and/or quality of the target cell received by the user equipment is below or equal to a predetermined threshold.

The indication of when the first timing advance value is or will be no longer valid for the user equipment to transmit uplink to the target cell may be received indirectly from the second access node via a centralized unit.

The method may comprise signalling a response to the indication that the first timing advance value is or will soon be invalid, the response comprising an indication as to whether the user equipment has been instructed to re-acquire the timing advance of the target cell.

The method may comprise receiving, from the user equipment, a first indication of a current strength and/or quality of a signal of the target cell received by the user equipment, wherein the first indication is received in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a sixth aspect, there is provided a method for an apparatus for a second access node, the method comprising: causing a first timing advance value to be provided to a user equipment for enabling the user equipment to synchronize uplink transmissions to a timing of a target cell supported by the second access node; determining a validity time of the first timing advance value, wherein, the first timing advance value is considered invalid after the validity time; and signalling, to a first access node supporting a serving cell connected to the user equipment, an indication that the first timing advance value is or will soon be invalid before or on expiry of the validity time.

The method may comprise receiving a response to the indication that the first timing advance value is or will soon be invalid, the response comprising an indication as to whether the user equipment has been instructed to re-acquire the timing advance of the target cell.

The response may indicate that the user equipment has been instructed to re-acquire the timing advance of the target cell, and the method may comprise causing a second timing advance value to be provided to the user equipment for enabling the user equipment to synchronize uplink transmissions to a timing of a target cell supported by the second access node.

According to a seventh aspect, there is provided an apparatus for a first access node, the apparatus comprising: establishing circuitry for establishing a connection towards a user equipment via a serving cell supported by the first access node; instructing circuitry for instructing the user equipment to obtain a first timing advance value for a target cell supported by a second access node, wherein the first timing advance value indicates a timing for transmitting uplink transmissions to the target cell; receiving circuitry for receiving, from the second access node, an determining circuitry for indication that the first timing advance value is or will soon be invalid; and determining whether to instruct the user equipment to obtain a second timing advance value for the target cell in dependence on the received indication, the second timing advance value being obtained later in time than the first timing advance value.

The apparatus may comprise receiving circuitry for receiving, from the user equipment, a first indication of a current strength and/or quality of a signal of the target cell received by the user equipment, wherein the determining circuitry for determining whether to instruct the user equipment may comprise: determining circuitry for determining to instruct the user equipment to obtain the second timing advance value when the first indication indicates that the current strength and/or quality of the signal provided by the target cell received by the user equipment has increased above a predetermined threshold.

The apparatus may comprise receiving circuitry for receiving, from the user equipment, a first indication of a current strength and/or quality of a signal of the target cell received by the user equipment, wherein the determining circuitry for determining whether to instruct the user equipment may comprise: determining circuitry for determining to instruct the user equipment to release the first timing advance value when the first indication indicates that the current strength and/or quality of the target cell received by the user equipment is below or equal to a predetermined threshold.

The indication of when the first timing advance value is or will be no longer valid for the user equipment to transmit uplink to the target cell may be received indirectly from the second access node via a centralized unit.

The apparatus may comprise signalling circuitry for signalling a response to the indication that the first timing advance value is or will soon be invalid, the response comprising an indication as to whether the user equipment has been instructed to re-acquire the timing advance of the target cell.

The apparatus may comprise receiving circuitry for receiving, from the user equipment, a first indication of a current strength and/or quality of a signal of the target cell received by the user equipment, wherein the first indication is received in a layer 1 measurement report.

The instructing circuitry for instructing the user equipment to obtain the first timing advance value may be operated in response to: receiving, from the user equipment, a layer 1 measurement report indicating that a strength and/or quality of a signal provided by the target cell is above a preconfigured threshold.

According to an eighth aspect, there is provided an apparatus for a second access node, the apparatus comprising: causing circuitry for causing a first timing advance value to be provided to a user equipment for enabling the user equipment to synchronize uplink transmissions to a timing of a target cell supported by the second access node; determining circuitry for determining a validity time of the first timing advance value, wherein, the first timing advance value is considered invalid after the validity time; and signalling circuitry for signalling, to a first access node supporting a serving cell connected to the user equipment, an indication that the first timing advance value is or will soon be invalid before or on expiry of the validity time.

The apparatus may comprise receiving circuitry for receiving a response to the indication that the first timing advance value is or will soon be invalid, the response comprising an indication as to whether the user equipment has been instructed to re-acquire the timing advance of the target cell.

The response may indicate that the user equipment has been instructed to re-acquire the timing advance of the target cell, and the apparatus may comprise causing circuitry for causing a second timing advance value to be provided to the user equipment for enabling the user equipment to synchronize uplink transmissions to a timing of a target cell supported by the second access node.

According to a ninth aspect, there is provided non-transitory computer readable media comprising program instructions for causing an apparatus for a first access node to perform: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the second access node, an indication that the first timing advance value is or will soon be invalid; and determining whether to instruct the user equipment to obtain a second timing advance value for the target cell in dependence on the received indication, the second timing advance value being obtained later in time than the first timing advance value.

The apparatus may be caused to perform receiving, from the user equipment, a first indication of a current strength and/or quality of a signal of the target cell received by the user equipment, wherein the determining whether to instruct the user equipment may comprise: determining to instruct the user equipment to obtain the second timing advance value when the first indication indicates that the current strength and/or quality of the signal provided by the target cell received by the user equipment has increased above a predetermined threshold.

The apparatus may be caused to perform receiving, from the user equipment, a first indication of a current strength and/or quality of a signal of the target cell received by the user equipment, wherein the determining whether to instruct the user equipment may comprise: determining to instruct the user equipment to release the first timing advance value when the first indication indicates that the current strength and/or quality of the target cell received by the user equipment is below or equal to a predetermined threshold.

The indication of when the first timing advance value is or will be no longer valid for the user equipment to transmit uplink to the target cell may be received indirectly from the second access node via a centralized unit.

The apparatus may be caused to perform signalling a response to the indication that the first timing advance value is or will soon be invalid, the response comprising an indication as to whether the user equipment has been instructed to re-acquire the timing advance of the target cell.

The apparatus may be caused to perform receiving, from the user equipment, a first indication of a current strength and/or quality of a signal of the target cell received by the user equipment, wherein the first indication is received in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a tenth aspect, there is provided non-transitory computer readable media comprising program instructions for causing an apparatus for a second access node to perform: causing a first timing advance value to be provided to a user equipment for enabling the user equipment to synchronize uplink transmissions to a timing of a target cell supported by the second access node; determining a validity time of the first timing advance value, wherein, the first timing advance value is considered invalid after the validity time; and signalling, to a first access node supporting a serving cell connected to the user equipment, an indication that the first timing advance value is or will soon be invalid before or on expiry of the validity time.

The apparatus may be caused to perform receiving a response to the indication that the first timing advance value is or will soon be invalid, the response comprising an indication as to whether the user equipment has been instructed to re-acquire the timing advance of the target cell.

The response may indicate that the user equipment has been instructed to re-acquire the timing advance of the target cell, and the apparatus may be caused to perform causing a second timing advance value to be provided to the user equipment for enabling the user equipment to synchronize uplink transmissions to a timing of a target cell supported by the second access node.

According to an eleventh aspect, there is provided an apparatus for a first access node, the apparatus comprising means for performing: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the second access node, an indication of when the first timing advance value will be invalid; using the indication of when the first timing advance value will be invalid to determine that the first timing advance value is or will soon be invalid; and determining, in response to said using, whether to instruct the user equipment to obtain a second timing advance value for the target cell, the second timing advance value being obtained later in time than the first timing advance value.

The apparatus may comprise means for receiving, from the user equipment, a first indication of a current strength and/or quality of a signal of the target cell received by the user equipment wherein the determining whether to instruct the user equipment may comprise: determining to instruct the user equipment to obtain the second timing advance value when the first indication indicates that the current strength and/or quality of the signal provided by the target cell received by the user equipment has increased above a predetermined threshold.

The apparatus may comprise means for receiving, from the user equipment, a first indication of a current strength and/or quality of a signal of the target cell received by the user equipment wherein the determining whether to instruct the user equipment may comprise: determining to instruct the user equipment to release the first timing advance value when the first indication indicates that the current strength and/or quality of the signal provided by the target cell received by the user equipment is below or equal to a predetermined threshold.

The indication of when the first timing advance value will be invalid for the user equipment to transmit uplink to the target cell may be received indirectly from the second access node via a centralized unit.

The indication of when the first timing advance value will be invalid may comprise a timer value, and the apparatus may comprise means for performing: starting a timer using the timer value; and determining that the first timing advance value is or will soon be invalid in response to expiry of the timer.

When the apparatus comprises means for receiving, from the user equipment, a first indication of a current strength and/or quality of a signal of the target cell received by the user equipment, the first indication may be received in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a twelfth aspect, there is provided an apparatus for a second access node, the apparatus comprising means for performing: causing a first timing advance value to be provided to a user equipment for enabling the user equipment to synchronize uplink transmissions to a timing of a target cell supported by the second access node; determining a validity time of the first timing advance value, wherein, the first timing advance value is considered invalid after the validity time; and signalling, to a first access node supporting a serving cell connected to the user equipment, said validity time.

According to a thirteenth aspect, there is provided an apparatus for a first access node, the apparatus comprising: at least one processor; and at least one memory comprising software code that, when executed by the at least one processor, causes the apparatus to perform: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the second access node, an indication of when the first timing advance value will be invalid; using the indication of when the first timing advance value will be invalid to determine that the first timing advance value is or will soon be invalid; and determining, in response to said using, whether to instruct the user equipment to obtain a second timing advance value for the target cell, the second timing advance value being obtained later in time than the first timing advance value.

The apparatus may be caused to perform receiving, from the user equipment, a first indication of a current strength and/or quality of a signal of the target cell received by the user equipment wherein the determining whether to instruct the user equipment may comprise: determining to instruct the user equipment to obtain the second timing advance value when the first indication indicates that the current strength and/or quality of the signal provided by the target cell received by the user equipment has increased above a predetermined threshold.

The apparatus may be caused to perform receiving, from the user equipment, a first indication of a current strength and/or quality of a signal of the target cell received by the user equipment wherein the determining whether to instruct the user equipment may comprise: determining to instruct the user equipment to release the first timing advance value when the first indication indicates that the current strength and/or quality of the signal provided by the target cell received by the user equipment is below or equal to a predetermined threshold.

The indication of when the first timing advance value will be invalid for the user equipment to transmit uplink to the target cell may be received indirectly from the second access node via a centralized unit.

The indication of when the first timing advance value will be invalid may comprise a timer value, and the apparatus may be caused to perform: starting a timer using the timer value; and determining that the first timing advance value is or will soon be invalid in response to expiry of the timer.

When the apparatus is caused to perform receiving, from the user equipment, a first indication of a current strength and/or quality of a signal of the target cell received by the user equipment, the first indication may be received in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a fourteenth aspect, there is provided an apparatus for a second access node, the apparatus comprising: at least one processor; and at least one memory comprising software code that, when executed by the at least one processor, causes the apparatus to perform: causing a first timing advance value to be provided to a user equipment for enabling the user equipment to synchronize uplink transmissions to a timing of a target cell supported by the second access node; determining a validity time of the first timing advance value, wherein, the first timing advance value is considered invalid after the validity time; and signalling, to a first access node supporting a serving cell connected to the user equipment, said validity time.

According to a fifteenth aspect, there is provided a method for an apparatus for a first access node, the method comprising: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the second access node, an indication of when the first timing advance value will be invalid; using the indication of when the first timing advance value will be invalid to determine that the first timing advance value is or will soon be invalid; and determining, in response to said using, whether to instruct the user equipment to obtain a second timing advance value for the target cell, the second timing advance value being obtained later in time than the first timing advance value.

The method may comprise receiving, from the user equipment, a first indication of a current strength and/or quality of a signal of the target cell received by the user equipment wherein the determining whether to instruct the user equipment may comprise: determining to instruct the user equipment to obtain the second timing advance value when the first indication indicates that the current strength and/or quality of the signal provided by the target cell received by the user equipment has increased above a predetermined threshold.

The method may comprise receiving, from the user equipment, a first indication of a current strength and/or quality of a signal of the target cell received by the user equipment wherein the determining whether to instruct the user equipment may comprise: determining to instruct the user equipment to release the first timing advance value when the first indication indicates that the current strength and/or quality of the signal provided by the target cell received by the user equipment is below or equal to a predetermined threshold.

The indication of when the first timing advance value will be invalid for the user equipment to transmit uplink to the target cell may be received indirectly from the second access node via a centralized unit.

The indication of when the first timing advance value will be invalid may comprise a timer value, and the method may comprise: starting a timer using the timer value; and determining that the first timing advance value is or will soon be invalid in response to expiry of the timer.

When the method comprises receiving, from the user equipment, a first indication of a current strength and/or quality of a signal of the target cell received by the user equipment, the first indication may be received in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a sixteenth aspect, there is provided a method for an apparatus for a second access node, the method comprising: causing a first timing advance value to be provided to a user equipment for enabling the user equipment to synchronize uplink transmissions to a timing of a target cell supported by the second access node; determining a validity time of the first timing advance value, wherein, the first timing advance value is considered invalid after the validity time; and signalling, to a first access node supporting a serving cell connected to the user equipment, said validity time.

According to a seventeenth aspect, there is provided an apparatus for a first access node, the apparatus comprising: establishing circuitry for establishing a connection towards a user equipment via a serving cell supported by the first access node; instructing circuitry for instructing the user equipment to obtain a first timing advance value for a target cell supported by a second access node, wherein the first timing advance value indicates a timing for transmitting uplink transmissions to the target cell; receiving circuitry for receiving, from the second access node, an indication of when the first timing advance value will be invalid; using the indication of when the first timing advance value will be invalid to determine that the first timing advance value is or will soon be invalid; and determining circuitry for determining, in response to said using, whether to instruct the user equipment to obtain a second timing advance value for the target cell, the second timing advance value being obtained later in time than the first timing advance value.

The apparatus may comprise receiving circuitry for receiving, from the user equipment, a first indication of a current strength and/or quality of a signal of the target cell received by the user equipment wherein the determining circuitry for determining whether to instruct the user equipment may comprise: determining circuitry for determining to instruct the user equipment to obtain the second timing advance value when the first indication indicates that the current strength and/or quality of the signal provided by the target cell received by the user equipment has increased above a predetermined threshold.

The apparatus may comprise receiving circuitry for receiving, from the user equipment, a first indication of a current strength and/or quality of a signal of the target cell received by the user equipment wherein the determining circuitry for determining whether to instruct the user equipment may comprise: determining circuitry for determining to instruct the user equipment to release the first timing advance value when the first indication indicates that the current strength and/or quality of the signal provided by the target cell received by the user equipment is below or equal to a predetermined threshold.

The indication of when the first timing advance value will be invalid for the user equipment to transmit uplink to the target cell may be received indirectly from the second access node via a centralized unit.

The indication of when the first timing advance value will be invalid may comprise a timer value, and the apparatus may comprise: starting circuitry for starting a timer using the timer value; and determining circuitry for determining that the first timing advance value is or will soon be invalid in response to expiry of the timer.

When the apparatus comprises receiving circuitry for receiving, from the user equipment, a first indication of a current strength and/or quality of a signal of the target cell received by the user equipment, the first indication may be received in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to an eighteenth aspect, there is provided an apparatus for a second access node, the apparatus comprising: causing circuitry for causing a first timing advance value to be provided to a user equipment for enabling the user equipment to synchronize uplink transmissions to a timing of a target cell supported by the second access node; determining circuitry for determining a validity time of the first timing advance value, wherein, the first timing advance value is considered invalid after the validity time; and signalling circuitry for signalling, to a first access node supporting a serving cell connected to the user equipment, said validity time.

According to a nineteenth aspect, there is provided non-transitory computer readable media comprising program instructions for causing an apparatus for a first access node to perform: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the second access node, an indication of when the first timing advance value will be invalid; using the indication of when the first timing advance value will be invalid to determine that the first timing advance value is or will soon be invalid; and determining, in response to said using, whether to instruct the user equipment to obtain a second timing advance value for the target cell, the second timing advance value being obtained later in time than the first timing advance value.

The apparatus may be caused to perform receiving, from the user equipment, a first indication of a current strength and/or quality of a signal of the target cell received by the user equipment wherein the determining whether to instruct the user equipment may comprise: determining to instruct the user equipment to obtain the second timing advance value when the first indication indicates that the current strength and/or quality of the signal provided by the target cell received by the user equipment has increased above a predetermined threshold.

The apparatus may be caused to perform receiving, from the user equipment, a first indication of a current strength and/or quality of a signal of the target cell received by the user equipment wherein the determining whether to instruct the user equipment may comprise: determining to instruct the user equipment to release the first timing advance value when the first indication indicates that the current strength and/or quality of the signal provided by the target cell received by the user equipment is below or equal to a predetermined threshold.

The indication of when the first timing advance value will be invalid for the user equipment to transmit uplink to the target cell may be received indirectly from the second access node via a centralized unit.

The indication of when the first timing advance value will be invalid may comprise a timer value, and the apparatus may be caused to perform: starting a timer using the timer value; and determining that the first timing advance value is or will soon be invalid in response to expiry of the timer.

When the apparatus is caused to perform receiving, from the user equipment, a first indication of a current strength and/or quality of a signal of the target cell received by the user equipment, the first indication may be received in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a twentieth aspect, there is provided non-transitory computer readable media comprising program instructions for causing an apparatus for a second access node to perform: causing a first timing advance value to be provided to a user equipment for enabling the user equipment to synchronize uplink transmissions to a timing of a target cell supported by the second access node; determining a validity time of the first timing advance value, wherein, the first timing advance value is considered invalid after the validity time; and signalling, to a first access node supporting a serving cell connected to the user equipment, said validity time.

According to a twenty first aspect, there is provided an apparatus for a first access node, the apparatus comprising means for performing: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the user equipment, an indication that the first timing advance value is or will soon be invalid; and determining whether to instruct the user equipment to obtain a second timing advance value for the target cell in dependence on the received indication, the second timing advance value being obtained later in time than the first timing advance value.

The apparatus may comprise means for receiving, from the user equipment, a first indication of a current strength and/or quality of a signal of the target cell received by the user equipment, and wherein the determining whether to instruct the user equipment may comprise: determining to instruct the user equipment to obtain the second timing advance value when the first indication indicates that the current strength and/or quality of the signal of the target cell received by the user equipment has increased above a predetermined threshold.

The apparatus may comprise means for receiving, from the user equipment, a first indication of a current strength and/or quality of a signal of the target cell received by the user equipment, wherein the determining whether to instruct the user equipment may comprise: determining to instruct the user equipment to release the first timing advance value when the first indication indicates that the current strength and/or quality of the signal of the target cell received by the user equipment is below or equal to a predetermined threshold.

The apparatus may comprise means for receiving the first indication in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a twenty second aspect, there is provided an apparatus for a user equipment, the apparatus comprising means for performing: obtaining, a first timing advance value for a target cell supported by a second access node, wherein the first timing advance value indicates a timing for transmitting uplink transmissions to the target cell; receiving, an indication of when the first timing advance value will be invalid; using the indication of when the first timing advance value will be invalid to determine that the first timing advance value is or will soon be invalid; and signalling, in response to said using, to a serving cell supported by a first access node, an indication that the first timing advance value is or will soon be invalid.

The apparatus may comprise means for performing signalling, to the serving cell, a first indication of a current strength and/or quality of a signal of the target cell received by the user equipment, wherein the first indication is signaled in a layer 1 measurement report.

The indication of when the first timing advance value will be invalid may comprise a timer value, and the apparatus may comprise means for performing: starting a timer using the timer value; and determining that the first timing advance value is or will soon be invalid in response to expiry of the timer.

The indication of when the first timing advance value will be invalid may be obtained prior to obtaining the first timing advance value.

The indication of when the first timing advance value will be invalid may be provided in a configuration for lower layer triggered mobility.

The apparatus may comprise means for performing: receiving, from the serving cell, an instruction to obtain a second timing advance value, the second timing advance value being obtained later in time than the first timing advance value; and obtaining the second timing advance value in response to the instruction.

The apparatus may comprise means for performing: receiving, from the serving cell, an instruction to release the first timing advance value; and releasing the first timing advance value.

According to a twenty third aspect, there is provided an apparatus for a first access node, the apparatus comprising: at least one processor; and at least one memory comprising software code that, when executed by the at least one processor, causes the apparatus to perform: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the user equipment, an indication that the first timing advance value is or will soon be invalid; and determining whether to instruct the user equipment to obtain a second timing advance value for the target cell in dependence on the received indication, the second timing advance value being obtained later in time than the first timing advance value.

The apparatus may be caused to perform receiving, from the user equipment, a first indication of a current strength and/or quality of a signal of the target cell received by the user equipment, and wherein the determining whether to instruct the user equipment may comprise: determining to instruct the user equipment to obtain the second timing advance value when the first indication indicates that the current strength and/or quality of the signal of the target cell received by the user equipment has increased above a predetermined threshold.

The apparatus may be caused to perform receiving, from the user equipment, a first indication of a current strength and/or quality of a signal of the target cell received by the user equipment, wherein the determining whether to instruct the user equipment may comprise: determining to instruct the user equipment to release the first timing advance value when the first indication indicates that the current strength and/or quality of the signal of the target cell received by the user equipment is below or equal to a predetermined threshold.

The apparatus may be caused to perform receiving the first indication in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a twenty fourth aspect, there is provided an apparatus for a user equipment, the apparatus comprising: at least one processor; and at least one memory comprising software code that, when executed by the at least one processor, causes the apparatus to perform: obtaining, a first timing advance value for a target cell supported by a second access node, wherein the first timing advance value indicates a timing for transmitting uplink transmissions to the target cell; receiving, an indication of when the first timing advance value will be invalid; using the indication of when the first timing advance value will be invalid to determine that the first timing advance value is or will soon be invalid; and signalling, in response to said using, to a serving cell supported by a first access node, an indication that the first timing advance value is or will soon be invalid.

The apparatus may be caused to perform signalling, to the serving cell, a first indication of a current strength and/or quality of a signal of the target cell received by the user equipment, wherein the first indication is signaled in a layer 1 measurement report.

The indication of when the first timing advance value will be invalid may comprise a timer value, and the apparatus may be caused to perform: starting a timer using the timer value; and determining that the first timing advance value is or will soon be invalid in response to expiry of the timer.

The indication of when the first timing advance value will be invalid may be obtained prior to obtaining the first timing advance value.

The indication of when the first timing advance value will be invalid may be provided in a configuration for lower layer triggered mobility.

The apparatus may be caused to perform: receiving, from the serving cell, an instruction to obtain a second timing advance value, the second timing advance value being obtained later in time than the first timing advance value; and obtaining the second timing advance value in response to the instruction.

The apparatus may be caused to perform: receiving, from the serving cell, an instruction to release the first timing advance value; and releasing the first timing advance value.

According to a twenty fifth aspect, there is provided a method for an apparatus for a first access node, the method comprising: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the user equipment, an indication that the first timing advance value is or will soon be invalid; and determining whether to instruct the user equipment to obtain a second timing advance value for the target cell in dependence on the received indication, the second timing advance value being obtained later in time than the first timing advance value.

The method may comprise receiving, from the user equipment, a first indication of a current strength and/or quality of a signal of the target cell received by the user equipment, and wherein the determining whether to instruct the user equipment may comprise: determining to instruct the user equipment to obtain the second timing advance value when the first indication indicates that the current strength and/or quality of the signal of the target cell received by the user equipment has increased above a predetermined threshold.

The method may comprise receiving, from the user equipment, a first indication of a current strength and/or quality of a signal of the target cell received by the user equipment, wherein the determining whether to instruct the user equipment may comprise: determining to instruct the user equipment to release the first timing advance value when the first indication indicates that the current strength and/or quality of the signal of the target cell received by the user equipment is below or equal to a predetermined threshold.

The method may comprise receiving the first indication in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a twenty sixth aspect, there is provided a method for an apparatus for a user equipment, the method comprising: obtaining, a first timing advance value for a target cell supported by a second access node, wherein the first timing advance value indicates a timing for transmitting uplink transmissions to the target cell; receiving, an indication of when the first timing advance value will be invalid; using the indication of when the first timing advance value will be invalid to determine that the first timing advance value is or will soon be invalid; and signalling, in response to said using, to a serving cell supported by a first access node, an indication that the first timing advance value is or will soon be invalid.

The method may comprise signalling, to the serving cell, a first indication of a current strength and/or quality of a signal of the target cell received by the user equipment, wherein the first indication is signaled in a layer 1 measurement report.

The indication of when the first timing advance value will be invalid may comprise a timer value, and the method may comprise: starting a timer using the timer value; and determining that the first timing advance value is or will soon be invalid in response to expiry of the timer.

The indication of when the first timing advance value will be invalid may be obtained prior to obtaining the first timing advance value.

The indication of when the first timing advance value will be invalid may be provided in a configuration for lower layer triggered mobility.

The method may comprise: receiving, from the serving cell, an instruction to obtain a second timing advance value, the second timing advance value being obtained later in time than the first timing advance value; and obtaining the second timing advance value in response to the instruction.

The method may comprise: receiving, from the serving cell, an instruction to release the first timing advance value; and releasing the first timing advance value.

According to a twenty seventh aspect, there is provided an apparatus for a first access node, the apparatus comprising: establishing circuitry for establishing a connection towards a user equipment via a serving cell supported by the first access node; instructing circuitry for instructing the user equipment to obtain a first timing advance value for a target cell supported by a second access node, wherein the first timing advance value indicates a timing for transmitting uplink transmissions to the target cell; receiving circuitry for receiving, from the user equipment, an indication that the first timing advance value is or will soon be invalid; and determining circuitry for determining whether to instruct the user equipment to obtain a second timing advance value for the target cell in dependence on the received indication, the second timing advance value being obtained later in time than the first timing advance value.

The apparatus may comprise receiving circuitry for receiving, from the user equipment, a first indication of a current strength and/or quality of a signal of the target cell received by the user equipment, and wherein the determining circuitry for determining whether to instruct the user equipment may comprise: determining circuitry for determining to instruct the user equipment to obtain the second timing advance value when the first indication indicates that the current strength and/or quality of the signal of the target cell received by the user equipment has increased above a predetermined threshold.

The apparatus may comprise receiving circuitry for receiving, from the user equipment, a first indication of a current strength and/or quality of a signal of the target cell received by the user equipment, wherein the determining circuitry for determining whether to instruct the user equipment may comprise: determining circuitry for determining to instruct the user equipment to release the first timing advance value when the first indication indicates that the current strength and/or quality of the signal of the target cell received by the user equipment is below or equal to a predetermined threshold.

The apparatus may comprise receiving circuitry for receiving the first indication in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a twenty eighth aspect, there is provided an apparatus for a user equipment, the apparatus comprising: obtaining circuitry for obtaining, a first timing advance value for a target cell supported by a second access node, wherein the first timing advance value indicates a timing for transmitting uplink transmissions to the target cell; receiving circuitry for receiving, an indication of when the first timing advance value will be invalid; using the indication of when the first timing advance value will be invalid to determine that the first timing advance value is or will soon be invalid; and signalling, in response to said using, to a serving cell supported by a first access node, an indication that the first timing advance value is or will soon be invalid.

The apparatus may comprise signalling circuitry for signalling, to the serving cell, a first indication of a current strength and/or quality of a signal of the target cell received by the user equipment, wherein the first indication is signaled in a layer 1 measurement report.

The indication of when the first timing advance value will be invalid may comprise a timer value, and the apparatus may comprise: starting circuitry for starting a timer using the timer value; and determining circuitry for determining that the first timing advance value is or will soon be invalid in response to expiry of the timer.

The indication of when the first timing advance value will be invalid may be obtained prior to obtaining the first timing advance value.

The indication of when the first timing advance value will be invalid may be provided in a configuration for lower layer triggered mobility.

The apparatus may comprise: receiving circuitry for receiving, from the serving cell, an instruction to obtain a second timing advance value, the second timing advance value being obtained later in time than the first timing advance value; and obtaining circuitry for obtaining the second timing advance value in response to the instruction.

The apparatus may comprise: receiving circuitry for receiving, from the serving cell, an instruction to release the first timing advance value; and releasing the first timing advance value.

According to a twenty ninth aspect, there is provided non-transitory computer readable media comprising program instructions for causing an apparatus for a first access node to perform: establishing a connection towards a user equipment via a serving cell supported by the first access node; instructing the user equipment to obtain a first timing advance value for a target cell supported by a second access node, wherein the first timing advance value indicates a timing for transmitting uplink transmissions to the target cell; receiving, from the user equipment, an indication that the first timing advance value is or will soon be invalid; and determining whether to instruct the user equipment to obtain a second timing advance value for the target cell in dependence on the received indication, the second timing advance value being obtained later in time than the first timing advance value.

The apparatus may be caused to perform receiving, from the user equipment, a first indication of a current strength and/or quality of a signal of the target cell received by the user equipment, and wherein the determining whether to instruct the user equipment may comprise: determining to instruct the user equipment to obtain the second timing advance value when the first indication indicates that the current strength and/or quality of the signal of the target cell received by the user equipment has increased above a predetermined threshold.

The apparatus may be caused to perform receiving, from the user equipment, a first indication of a current strength and/or quality of a signal of the target cell received by the user equipment, wherein the determining whether to instruct the user equipment may comprise: determining to instruct the user equipment to release the first timing advance value when the first indication indicates that the current strength and/or quality of the signal of the target cell received by the user equipment is below or equal to a predetermined threshold.

The apparatus may be caused to perform receiving the first indication in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

According to a thirtieth aspect, there is provided non-transitory computer readable media comprising program instructions for causing an apparatus for a user equipment to perform: obtaining, a first timing advance value for a target cell supported by a second access node, wherein the first timing advance value indicates a timing for transmitting uplink transmissions to the target cell; receiving, an indication of when the first timing advance value will be invalid; using the indication of when the first timing advance value will be invalid to determine that the first timing advance value is or will soon be invalid; and signalling, in response to said using, to a serving cell supported by a first access node, an indication that the first timing advance value is or will soon be invalid.

The apparatus may be caused to perform signalling, to the serving cell, a first indication of a current strength and/or quality of a signal of the target cell received by the user equipment, wherein the first indication is signaled in a layer 1 measurement report.

The indication of when the first timing advance value will be invalid may comprise a timer value, and the apparatus may be caused to perform: starting a timer using the timer value; and determining that the first timing advance value is or will soon be invalid in response to expiry of the timer.

The indication of when the first timing advance value will be invalid may be obtained prior to obtaining the first timing advance value.

The indication of when the first timing advance value will be invalid may be provided in a configuration for lower layer triggered mobility.

The apparatus may be caused to perform: receiving, from the serving cell, an instruction to obtain a second timing advance value, the second timing advance value being obtained later in time than the first timing advance value; and obtaining the second timing advance value in response to the instruction.

The apparatus may be caused to perform: receiving, from the serving cell, an instruction to release the first timing advance value; and releasing the first timing advance value.

According to a thirty first aspect, there is provided an apparatus for a user equipment, the apparatus comprising means for performing: receiving, a first timing advance value for a target cell supported by a second access node, wherein the first timing advance value indicates a timing for transmitting uplink transmissions to the target cell; receiving, an indication of when the first timing advance value will be invalid; using the indication of when the first timing advance value will be invalid to determine that the first timing advance value is or will soon be invalid; and determining whether to autonomously initiate obtaining a second timing advance value for the target cell in dependence on the determination of whether the first timing advance value is or will soon be invalid, the second timing advance value being obtained later in time than the first timing advance value.

The determining whether to autonomously initiate obtaining a second timing absence value may be further dependent on a current strength and/or quality of a signal of the target cell received by the user equipment.

The indication of when the first timing advance value will be invalid may comprise a timer value, and the apparatus may comprise means for performing: starting a timer using the timer value; and determining that the first timing advance value is or will soon be invalid in response to expiry of the timer.

The indication of when the first timing advance value will be invalid may be obtained prior to obtaining the first timing advance value.

The indication of when the first timing advance value will be invalid may be provided in a configuration for lower layer triggered mobility.

The apparatus may comprise means for performing: determining to autonomously initiate obtaining the second timing advance value for the target cell when determining that the first timing advance value is or will be soon invalid; and obtaining the second timing advance value in response to the determining to autonomously initiate the obtaining.

The apparatus may comprise means for performing: determining to not obtain second timing advance value for the target cell when a current strength and/or quality of a signal provided by the target cell is below or equal to a predetermined threshold; and releasing the first timing advance value in response to determining to not obtain the second timing advance value.

The determining whether to autonomously initiate obtaining a second timing advance value for the target cell may be further dependent on whether the user equipment has received, from the serving cell, an instruction to release the first timing advance value.

According to a thirty second aspect, there is provided an apparatus for a user equipment, the apparatus comprising: at least one processor; and at least one memory comprising software code that, when executed by the at least one processor, causes the apparatus to perform: receiving, a first timing advance value for a target cell supported by a second access node, wherein the first timing advance value indicates a timing for transmitting uplink transmissions to the target cell; receiving, an indication of when the first timing advance value will be invalid; using the indication of when the first timing advance value will be invalid to determine that the first timing advance value is or will soon be invalid; and determining whether to autonomously initiate obtaining a second timing advance value for the target cell in dependence on the determination of whether the first timing advance value is or will soon be invalid, the second timing advance value being obtained later in time than the first timing advance value.

The determining whether to autonomously initiate obtaining a second timing absence value may be further dependent on a current strength and/or quality of a signal of the target cell received by the user equipment.

The indication of when the first timing advance value will be invalid may comprise a timer value, and the apparatus may be caused to perform: starting a timer using the timer value; and determining that the first timing advance value is or will soon be invalid in response to expiry of the timer.

The indication of when the first timing advance value will be invalid may be obtained prior to obtaining the first timing advance value.

The indication of when the first timing advance value will be invalid may be provided in a configuration for lower layer triggered mobility.

The apparatus may apparatus may be caused to perform: determining to autonomously initiate obtaining the second timing advance value for the target cell when determining that the first timing advance value is or will be soon invalid; and obtaining the second timing advance value in response to the determining to autonomously initiate the obtaining.

The apparatus may be caused to perform: determining to not obtain second timing advance value for the target cell when a current strength and/or quality of a signal provided by the target cell is below or equal to a predetermined threshold; and releasing the first timing advance value in response to determining to not obtain the second timing advance value.

The determining whether to autonomously initiate obtaining a second timing advance value for the target cell may be further dependent on whether the user equipment has received, from the serving cell, an instruction to release the first timing advance value.

According to a thirty third aspect, there is provided a method for an apparatus for a user equipment, the method comprising: receiving, a first timing advance value for a target cell supported by a second access node, wherein the first timing advance value indicates a timing for transmitting uplink transmissions to the target cell; receiving, an indication of when the first timing advance value will be invalid; using the indication of when the first timing advance value will be invalid to determine that the first timing advance value is or will soon be invalid; and determining whether to autonomously initiate obtaining a second timing advance value for the target cell in dependence on the determination of whether the first timing advance value is or will soon be invalid, the second timing advance value being obtained later in time than the first timing advance value.

The determining whether to autonomously initiate obtaining a second timing absence value may be further dependent on a current strength and/or quality of a signal of the target cell received by the user equipment.

The indication of when the first timing advance value will be invalid may comprise a timer value, and the method may comprise: starting a timer using the timer value; and determining that the first timing advance value is or will soon be invalid in response to expiry of the timer.

The indication of when the first timing advance value will be invalid may be obtained prior to obtaining the first timing advance value.

The indication of when the first timing advance value will be invalid may be provided in a configuration for lower layer triggered mobility.

The method may comprise: determining to autonomously initiate obtaining the second timing advance value for the target cell when determining that the first timing advance value is or will be soon invalid; and obtaining the second timing advance value in response to the determining to autonomously initiate the obtaining.

The method may comprise: determining to not obtain second timing advance value for the target cell when a current strength and/or quality of a signal provided by the target cell is below or equal to a predetermined threshold; and releasing the first timing advance value in response to determining to not obtain the second timing advance value.

The determining whether to autonomously initiate obtaining a second timing advance value for the target cell may be further dependent on whether the user equipment has received, from the serving cell, an instruction to release the first timing advance value.

According to a thirty fourth aspect, there is provided an apparatus for a user equipment, the apparatus comprising: receiving circuitry for receiving, a first timing advance value for a target cell supported by a second access node, wherein the first timing advance value indicates a timing for transmitting uplink transmissions to the target cell; receiving circuitry for receiving, an indication of when the first timing advance value will be invalid; using circuitry for using the indication of when the first timing advance value will be invalid to determine that the first timing advance value is or will soon be invalid; and determining circuitry for determining whether to autonomously initiate obtaining a second timing advance value for the target cell in dependence on the determination of whether the first timing advance value is or will soon be invalid, the second timing advance value being obtained later in time than the first timing advance value.

The determining whether to autonomously initiate obtaining a second timing absence value may be further dependent on a current strength and/or quality of a signal of the target cell received by the user equipment.

The indication of when the first timing advance value will be invalid may comprise a timer value, and the apparatus may comprise: starting circuitry for starting a timer using the timer value; and determining circuitry for determining that the first timing advance value is or will soon be invalid in response to expiry of the timer.

The indication of when the first timing advance value will be invalid may be obtained prior to obtaining the first timing advance value.

The indication of when the first timing advance value will be invalid may be provided in a configuration for lower layer triggered mobility.

The apparatus may comprise: determining circuitry for determining to autonomously initiate obtaining the second timing advance value for the target cell when determining that the first timing advance value is or will be soon invalid; and obtaining circuitry for obtaining the second timing advance value in response to the determining to autonomously initiate the obtaining.

The apparatus may comprise: determining circuitry for determining to not obtain second timing advance value for the target cell when a current strength and/or quality of a signal provided by the target cell is below or equal to a predetermined threshold; and releasing circuitry for releasing the first timing advance value in response to determining to not obtain the second timing advance value.

The determining whether to autonomously initiate obtaining a second timing advance value for the target cell may be further dependent on whether the user equipment has received, from the serving cell, an instruction to release the first timing advance value.

According to a thirty fifth aspect, there is provided non-transitory computer readable media comprising program instructions for causing an apparatus for a user equipment to perform: receiving, a first timing advance value for a target cell supported by a second access node, wherein the first timing advance value indicates a timing for transmitting uplink transmissions to the target cell; receiving, an indication of when the first timing advance value will be invalid; using the indication of when the first timing advance value will be invalid to determine that the first timing advance value is or will soon be invalid; and determining whether to autonomously initiate obtaining a second timing advance value for the target cell in dependence on the determination of whether the first timing advance value is or will soon be invalid, the second timing advance value being obtained later in time than the first timing advance value.

The determining whether to autonomously initiate obtaining a second timing absence value may be further dependent on a current strength and/or quality of a signal of the target cell received by the user equipment.

The indication of when the first timing advance value will be invalid may comprise a timer value, and the apparatus may be caused to perform: starting a timer using the timer value; and determining that the first timing advance value is or will soon be invalid in response to expiry of the timer.

The indication of when the first timing advance value will be invalid may be obtained prior to obtaining the first timing advance value.

The indication of when the first timing advance value will be invalid may be provided in a configuration for lower layer triggered mobility.

The apparatus may apparatus may be caused to perform: determining to autonomously initiate obtaining the second timing advance value for the target cell when determining that the first timing advance value is or will be soon invalid; and obtaining the second timing advance value in response to the determining to autonomously initiate the obtaining.

The apparatus may be caused to perform: determining to not obtain second timing advance value for the target cell when a current strength and/or quality of a signal provided by the target cell is below or equal to a predetermined threshold; and releasing the first timing advance value in response to determining to not obtain the second timing advance value.

The determining whether to autonomously initiate obtaining a second timing advance value for the target cell may be further dependent on whether the user equipment has received, from the serving cell, an instruction to release the first timing advance value.

According to a thirty sixth aspect, there is provided an apparatus for a first access node, the apparatus comprising means for performing: establishing a connection towards a user equipment via a serving cell supported by the first access node; receiving configuration information comprising at least one indication of a duration of validity of timing advance values associated with a target cell supported by a second access node; instructing the user equipment to obtain a first timing advance value for the target cell, wherein the first timing advance value indicates a timing for transmitting uplink transmissions to the target cell; and monitoring a validity of the first timing advance value using the duration of validity.

The apparatus may comprise means for performing: determining that said monitoring indicates that the first timing advance value is or will soon be invalid; and determining, in response to said determining that the first timing advance value is or will soon be invalid, whether to instruct the user equipment to obtain a second timing advance value for the target cell, the second timing advance value being obtained later in time than the first timing advance value.

The determining whether to instruct the user equipment may comprise: receiving, from the user equipment, a first indication of a current strength and/or quality of a signal of the target cell received by the user equipment; and determining to instruct the user equipment to obtain the second timing advance value when the first indication indicates that the current strength and/or quality of the signal of the target cell received by the user equipment has increased above a predetermined threshold.

The determining whether to instruct the user equipment may comprise: receiving, from the user equipment, a first indication of a current strength and/or quality of a signal of the target cell received by the user equipment; and determining to instruct the user equipment to release the first timing advance value when the first indication indicates that the current strength and/or quality of the target cell received by the user equipment is below or equal to a predetermined threshold.

The indication of when the first timing advance value will be invalid may comprise a timer value, and the means for monitoring may comprise means for performing: starting a timer using the timer value; and determining that the first timing advance value is or will soon be invalid in response to expiry of the timer.

The apparatus may comprise means for receiving, from the user equipment, a first indication of a current strength and/or quality of a signal of the target cell received by the user equipment, wherein the first indication is received in a layer 1 measurement report.

The receiving configuration information may comprise receiving the configuration information from a centralised unit.

According to a thirty seventh aspect, there is provided an apparatus for a first access node, the apparatus comprising: at least one processor; and at least one memory comprising software code that, when executed by the at least one processor, causes the apparatus to perform: establishing a connection towards a user equipment via a serving cell supported by the first access node; receiving configuration information comprising at least one indication of a duration of validity of timing advance values associated with a target cell supported by a second access node; instructing the user equipment to obtain a first timing advance value for the target cell, wherein the first timing advance value indicates a timing for transmitting uplink transmissions to the target cell; and monitoring a validity of the first timing advance value using the duration of validity.

The apparatus may be caused to perform: determining that said monitoring indicates that the first timing advance value is or will soon be invalid; and determining, in response to said determining that the first timing advance value is or will soon be invalid, whether to instruct the user equipment to obtain a second timing advance value for the target cell, the second timing advance value being obtained later in time than the first timing advance value.

The determining whether to instruct the user equipment may comprise: receiving, from the user equipment, a first indication of a current strength and/or quality of a signal of the target cell received by the user equipment; and determining to instruct the user equipment to obtain the second timing advance value when the first indication indicates that the current strength and/or quality of the signal of the target cell received by the user equipment has increased above a predetermined threshold.

The determining whether to instruct the user equipment may comprise: receiving, from the user equipment, a first indication of a current strength and/or quality of a signal of the target cell received by the user equipment; and determining to instruct the user equipment to release the first timing advance value when the first indication indicates that the current strength and/or quality of the target cell received by the user equipment is below or equal to a predetermined threshold.

The indication of when the first timing advance value will be invalid may comprise a timer value, and the monitoring may comprise performing: starting a timer using the timer value; and determining that the first timing advance value is or will soon be invalid in response to expiry of the timer.

apparatus may be caused to perform receiving, from the user equipment, a first indication of a current strength and/or quality of a signal of the target cell received by the user equipment, wherein the first indication is received in a layer 1 measurement report.

The receiving configuration information may comprise receiving the configuration information from a centralised unit.

According to a thirty eighth aspect, there is provided a method for an apparatus for a first access node, the method comprising: establishing a connection towards a user equipment via a serving cell supported by the first access node; receiving configuration information comprising at least one indication of a duration of validity of timing advance values associated with a target cell supported by a second access node; instructing the user equipment to obtain a first timing advance value for the target cell, wherein the first timing advance value indicates a timing for transmitting uplink transmissions to the target cell; and monitoring a validity of the first timing advance value using the duration of validity.

The method may comprise: determining that said monitoring indicates that the first timing advance value is or will soon be invalid; and determining, in response to said determining that the first timing advance value is or will soon be invalid, whether to instruct the user equipment to obtain a second timing advance value for the target cell, the second timing advance value being obtained later in time than the first timing advance value.

The determining whether to instruct the user equipment may comprise: receiving, from the user equipment, a first indication of a current strength and/or quality of a signal of the target cell received by the user equipment; and determining to instruct the user equipment to obtain the second timing advance value when the first indication indicates that the current strength and/or quality of the signal of the target cell received by the user equipment has increased above a predetermined threshold.

The determining whether to instruct the user equipment may comprise: receiving, from the user equipment, a first indication of a current strength and/or quality of a signal of the target cell received by the user equipment; and determining to instruct the user equipment to release the first timing advance value when the first indication indicates that the current strength and/or quality of the target cell received by the user equipment is below or equal to a predetermined threshold.

The indication of when the first timing advance value will be invalid may comprise a timer value, and the monitoring may comprise: starting a timer using the timer value; and determining that the first timing advance value is or will soon be invalid in response to expiry of the timer.

method may comprise receiving, from the user equipment, a first indication of a current strength and/or quality of a signal of the target cell received by the user equipment, wherein the first indication is received in a layer 1 measurement report.

The receiving configuration information may comprise receiving the configuration information from a centralised unit.

According to a thirty ninth aspect, there is provided an apparatus for a first access node, the apparatus comprising: establishing circuitry for establishing a connection towards a user equipment via a serving cell supported by the first access node; receiving circuitry for receiving configuration information comprising at least one indication of a duration of validity of timing advance values associated with a target cell supported by a second access node; instructing circuitry for instructing the user equipment to obtain a first timing advance value for the target cell, wherein the first timing advance value indicates a timing for transmitting uplink transmissions to the target cell; and monitoring circuitry for monitoring a validity of the first timing advance value using the duration of validity.

The apparatus may comprise: determining circuitry for determining that said monitoring indicates that the first timing advance value is or will soon be invalid; and determining circuitry for determining, in response to said determining that the first timing advance value is or will soon be invalid, whether to instruct the user equipment to obtain a second timing advance value for the target cell, the second timing advance value being obtained later in time than the first timing advance value.

The determining circuitry for determining whether to instruct the user equipment may comprise: receiving circuitry for receiving, from the user equipment, a first indication of a current strength and/or quality of a signal of the target cell received by the user equipment; and determining circuitry for determining to instruct the user equipment to obtain the second timing advance value when the first indication indicates that the current strength and/or quality of the signal of the target cell received by the user equipment has increased above a predetermined threshold.

The determining circuitry for determining whether to instruct the user equipment may comprise: receiving circuitry for receiving, from the user equipment, a first indication of a current strength and/or quality of a signal of the target cell received by the user equipment; and determining circuitry for determining to instruct the user equipment to release the first timing advance value when the first indication indicates that the current strength and/or quality of the target cell received by the user equipment is below or equal to a predetermined threshold.

The indication of when the first timing advance value will be invalid may comprise a timer value, and the monitoring circuitry for monitoring may comprise: starting circuitry for starting a timer using the timer value; and determining circuitry for determining that the first timing advance value is or will soon be invalid in response to expiry of the timer.

The apparatus may comprise receiving circuitry for receiving, from the user equipment, a first indication of a current strength and/or quality of a signal of the target cell received by the user equipment, wherein the first indication is received in a layer 1 measurement report.

The receiving configuration information may comprise receiving the configuration information from a centralised unit.

According to a fortieth aspect, there is provided non-transitory computer readable media comprising program instructions for causing an apparatus for a first access node to perform: establishing a connection towards a user equipment via a serving cell supported by the first access node; receiving configuration information comprising at least one indication of a duration of validity of timing advance values associated with a target cell supported by a second access node; instructing the user equipment to obtain a first timing advance value for the target cell, wherein the first timing advance value indicates a timing for transmitting uplink transmissions to the target cell; and monitoring a validity of the first timing advance value using the duration of validity.

The apparatus may be caused to perform: determining that said monitoring indicates that the first timing advance value is or will soon be invalid; and determining, in response to said determining that the first timing advance value is or will soon be invalid, whether to instruct the user equipment to obtain a second timing advance value for the target cell, the second timing advance value being obtained later in time than the first timing advance value.

The determining whether to instruct the user equipment may comprise: receiving, from the user equipment, a first indication of a current strength and/or quality of a signal of the target cell received by the user equipment; and determining to instruct the user equipment to obtain the second timing advance value when the first indication indicates that the current strength and/or quality of the signal of the target cell received by the user equipment has increased above a predetermined threshold.

The determining whether to instruct the user equipment may comprise: receiving, from the user equipment, a first indication of a current strength and/or quality of a signal of the target cell received by the user equipment; and determining to instruct the user equipment to release the first timing advance value when the first indication indicates that the current strength and/or quality of the target cell received by the user equipment is below or equal to a predetermined threshold.

The indication of when the first timing advance value will be invalid may comprise a timer value, and the monitoring may comprise performing: starting a timer using the timer value; and determining that the first timing advance value is or will soon be invalid in response to expiry of the timer.

apparatus may be caused to perform receiving, from the user equipment, a first indication of a current strength and/or quality of a signal of the target cell received by the user equipment, wherein the first indication is received in a layer 1 measurement report.

The receiving configuration information may comprise receiving the configuration information from a centralised unit.

According to a forty first aspect, there is provided a computer program product (e.g., a software code) stored on a media that may cause an apparatus to perform any method as described herein.

According to a forty second aspect, there is provided an electronic device that may comprise apparatus as described herein.

According to a forty third aspect, there is provided a chipset that may comprise an apparatus as described herein.

BRIEF DESCRIPTION OF FIGURES

Some examples, will now be described, merely by way of illustration only, with reference to the accompanying drawings in which:

FIGS. 9 to 16 illustrate operations that may be performed by apparatus described herein.

DETAILED DESCRIPTION

The following describes operations that may be performed in relation to timing advance, including in relation to determining a validity of timing advance information.

Timing Advance (TA) command relates to the transmission of a command from an access node to a UE that enables the UE to adjust its uplink transmission for reception by the access node.

For example, a network access node may continually measure a time difference between a reception of an uplink signal (e.g., a physical uplink shared channel (PUSCH), a physical uplink control channel (PUCCH), and/or a sounding reference signal (SRS) reception) and a subframe time maintained at the network access node. Based on this measured time difference, the network access node may send a 'Timing Advance' command to the UE that causes the UE change its transmission time to make it better aligned with the subframe timing at the network side. When the uplink signal arrives at the network access node too early, the network access node may send a Timing Advance command to the UE saying "Transmit your signal a little bit later". Analogously, when the uplink signal arrives at the network access node too late, the network access node may send a Timing Advance command to the UE saying "Transmit your signal a little bit earlier".

Timing advance principles may also be provided in respect of facilitating mobility operations (such as, for example, handover, cell addition, cell change, etc.). For example, a UE may be provided with a timing advance to apply in respect of uplink transmissions to be made to a target cell in order to more quickly synchronise the UE's uplink transmissions to the subframe timing of the target cell. This may be applied in respect of intra-node handover (e.g., when the target cell and source cell are both provided by a same network access node).

In the following description of examples, certain aspects are explained with reference to devices that are often capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems (for example, current 6G proposals, IEEE 802.11, etc.).

Before describing in detail the examples, certain general principles of a 5G wireless communication system are briefly explained with reference to FIGS. 1 to 3.

Figure 1:
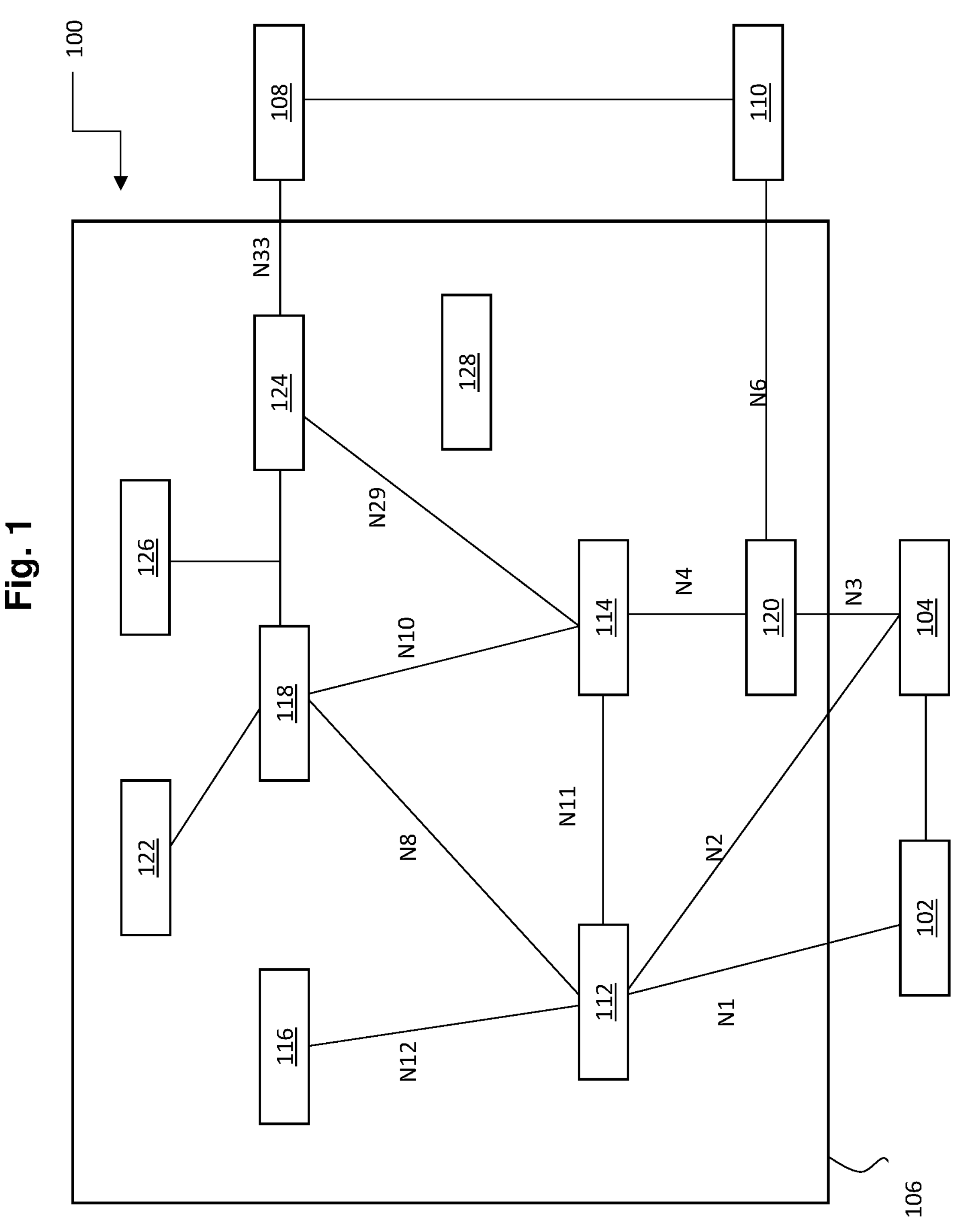
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

Figure 2:
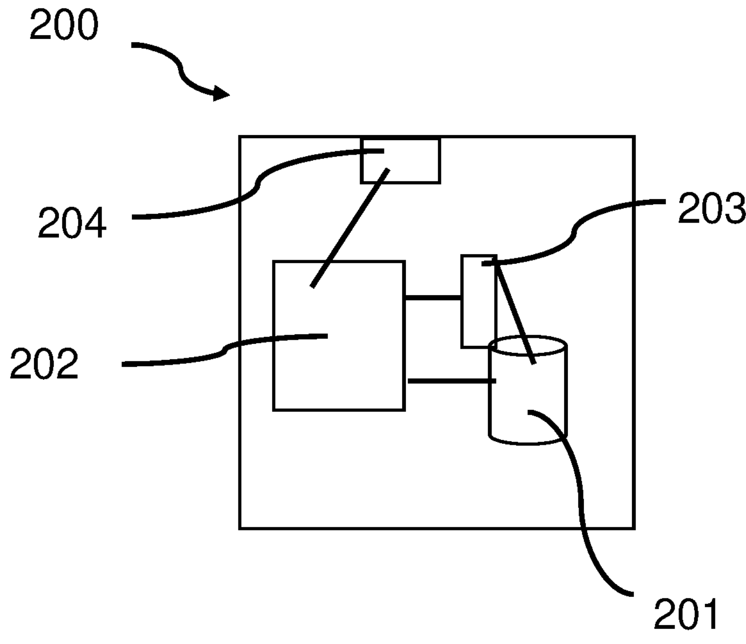
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions. References to "code" herein are understood to refer to software code, and vice versa.

The station of the access system may be categorised into two different types: distributed units (DUs), and centralised units (CUs).

A DU provides access node support for lower layers of the protocol stack (such as, for example, the radio link control (RLC), medium access control (MAC), and/or physical layer protocol layers). Each DU is able to support one or more cells, while each cell is able to support one or more beams.

A CU can support multiple DUs, and provides access node support for higher layers of the protocol stack within an access node (such as, for example, packet data convergence protocol (PDCP), service data adaptation protocol (SDAP), and/or radio resource control (RRC) protocol layers). The interface between a CU and a DU is labelled as an F1 interface. There is a single CU for each gNB, and CU's belonging to multiple gNB may be implemented using a shared hardware platform.

Figure 3:
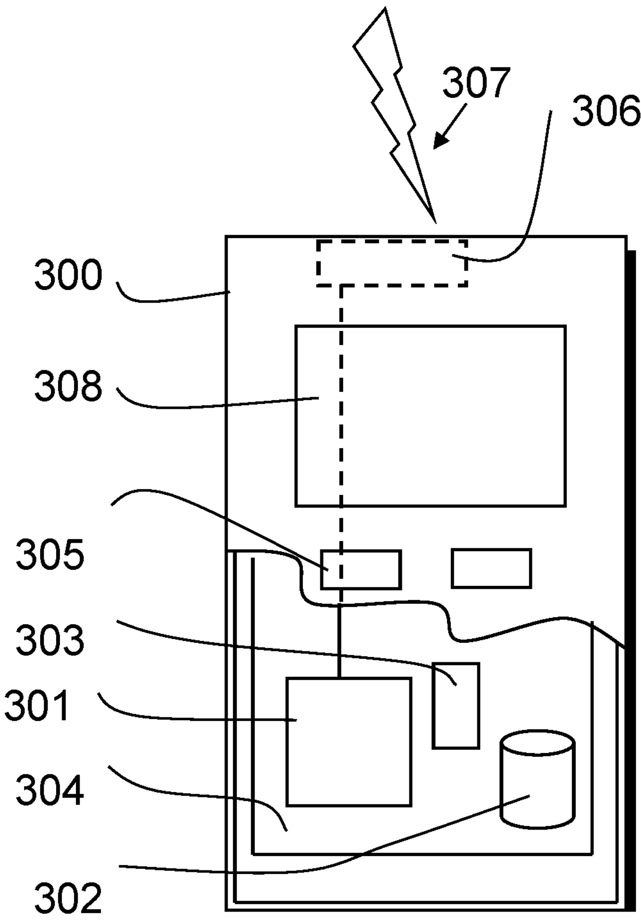
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software code and hardware aided execution of Tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or' wireless) to other devices and/or for connecting external accessories, for example hands-free equipment, thereto.

For clarity and brevity, certain terms used herein may be used interchangeably. For example, the terms "candidate cell", "target cell", and "candidate target cell" are used interchangeably herein. As another example, the terms "serving cell", "serving DU", "source cell", and "source DU" are used interchangeably herein. As another example, the terms "cell switch" and "handover" are used interchangeably herein.

In addition to existing mobility procedures, recent 3GPP studies have considered layer 1/layer 2 (L1/L2)-triggered mobility (LTM) procedures. Layer 1 refers to a physical layer. Layer 2 refers to a medium access control (MAC) layer.

LTM is one of the objectives for mobility enhancement work item in 3GPP Rel. 18. LTM introduces new techniques directed towards lowering a handover interruption time. According to the paradigm description of LTM, the decision about the cell change is based on L1 measurements and is made in the MAC layer in the Distributed Unit (DU). This is in contrast to layer 3 (L3) mobility procedures (e.g., network-triggered mobility procedures), in which the handover between two cells is decided by a radio resource control (RRC) layer.

3GPP has recently considered features and studies to be established in respect of early Timing Advance (TA) acquisition of a candidate target cell LTM.

In particular, 3GPP has looked into providing mechanisms and/or apparatus for:

Supporting TA acquisition of candidate cell(s) before cell switch command is received in L1/L2 based mobility.

Providing a mechanism to acquire TA of the candidate cells, with particular emphasis being directed towards:
- i. Random Access Channel (RACH)-based mechanisms, e.g., Physical Downlink Control Channel (PDCCH) ordered RACH, UE-triggered RACH, higher layer triggered RACH from a network (other than a Layer 3 (network layer) handover command);
- ii. RACH-less solutions, e.g., Sounding Reference Signal (SRS)-based TA acquisition, receive timing difference based, RACH-less mechanism (as in LTE), UE-based TA measurement (including UE-based TA measurement with one Timing Advance Command (TAC) from a serving cell)

Providing a mechanism to acquire TA of the candidate cell(s) that at least supports PDCCH ordered RACH when the PDCHH order is only triggered by the source cell. It is for future study how the form of such a RACH mechanism is to be implemented (e.g., what downlink control information (DCI) is to be provided, RACH resource allocation, etc.).

TA updating (i.e., re-acquisition of TA) for candidate cell can be triggered by network. The triggering mechanism may reuse the mechanism used for an initial TA acquisition (e.g., PDCCH order triggered RACH for a candidate cell).

For PDCCH ordered RACH in LTM, 3GPP is looking to support providing an indication of candidate cell and/or a RACH Occasion (RO) of candidate cell in DCI, and providing a configuration of RACH resource for candidate cell(s) prior to the transmission of the PDCCH order.

3GPP is further determining whether to include the transmission of a Random Access Response (RAR) to a RACH preamble transmission for PDCCH ordered RACH for a candidate cell in LTM. The three options are to always include a RAR, never include a RAR, or include a RAR in dependence on a dynamic configuration of the UE in a specific implementation.

Figure 4:
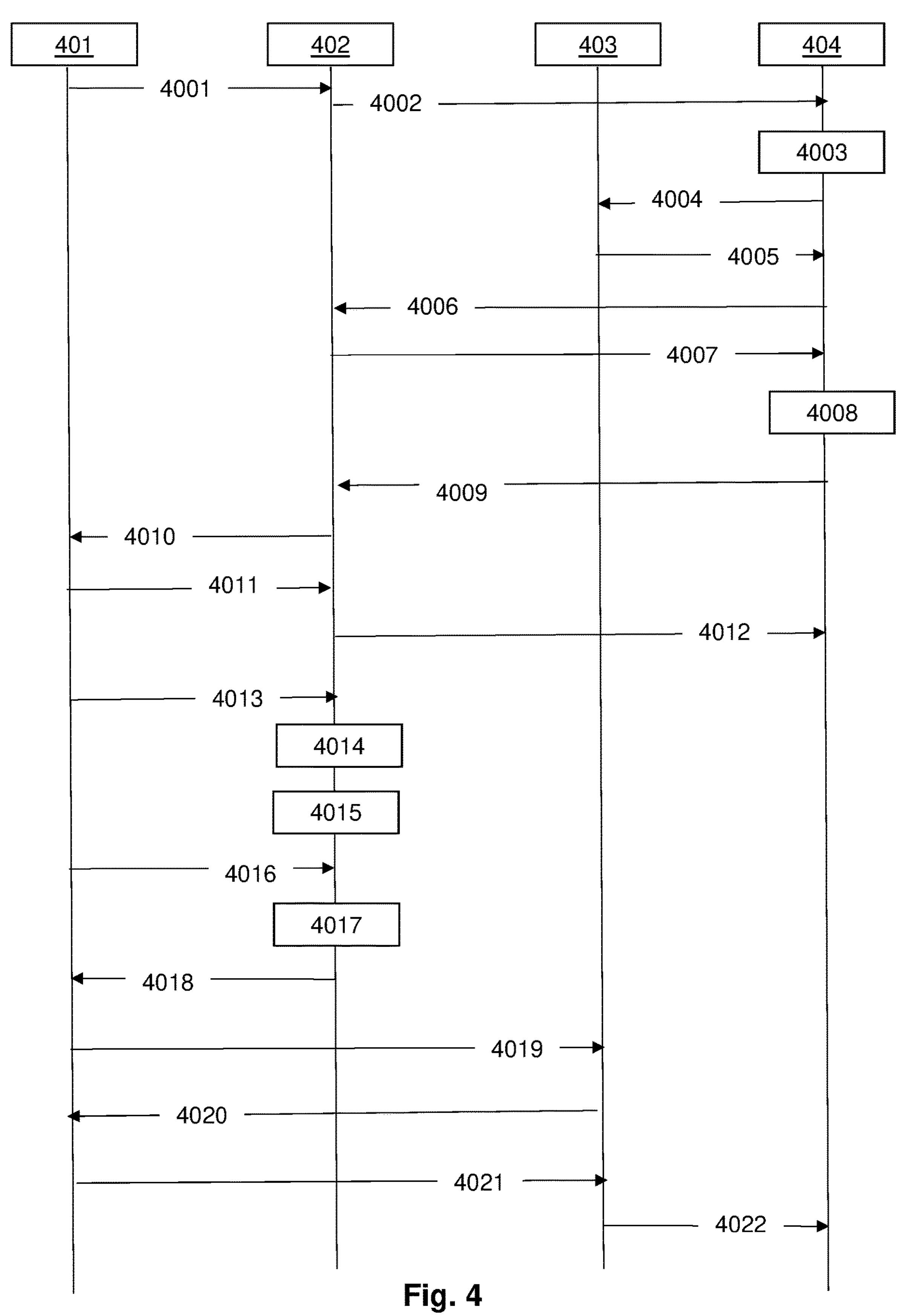
FIG. 4 illustrates signalling.

FIG. 4 illustrates example signalling that may be performed in relation of LTM from a serving cell in a first distributed unit (DU1) to a target cell in a second distributed unit (DU2). This scenario is referred to as an inter-DU-intra-CU scenario. An analogous signalling diagram applies for intra-DU-intra-CU cell changes, in which DU1 is the same distributed unit as DU2.

FIG. 4 illustrates signalling that may be performed by a UE 401, a source DU 402 (e.g., a DU currently providing a serving cell to the UE 601), a target DU 403 (e.g., a handover candidate DU), and a CU 404 as part of an inter-DU LTM scenario.

4001 to 4012 relate to a mobility preparation stage.

During 4001, the UE 401 signals an L3 measurement report to the source DU 402.

During 4002, the source DU 402 forwards the received L3 measurement report of 4001 to the CU 404. This signalling of 4002 may be performed using an uplink RRC message transfer operation.

During 4003, the CU 404 determines, based on the received L3 measurement report, that another cell should be prepared for serving the UE instead of or in addition to the current serving cell provided by the source DU 402. Based on this determination, the CU 404 proceeds in setting up UE context for the UE 401 at the target DU 402 during 4004 to 4005).

During 4004, the CU 404 signals the target DU 403. This signalling may comprise a UE context setup request operation for setting up a UE context for the UE 401 at the target DU 402.

During 4005, the target DU 403 signals the CU 404. This signaling may comprise a response to the UE context setup request.

During 4006, the CU 404 signals the source DU 402. This signalling may request a modification of the UE context stored at the DU 402 (if needed), and/or may provide information on the target cell. For example, this signalling may provide information on a reference signal configuration of a target cell provided by the target DU 403, transmission configuration indicator (TCI) states of the target cell, and so on. The signalling may comprise a UE context modification request operation.

During 4007, the source DU 402 signals the CU 404. This signalling may comprise a response to the signalling of 4006 to confirm receipt of the signalling of 4006. This signalling may comprise a UE context modification response operation.

During 4008, the CU 404 generates an RRC reconfiguration for the UE 401.

This RRC reconfiguration may comprise a reconfiguration of the UE's current measurement configuration for performing L1 measurements. For example, this RRC reconfiguration may comprise a measurement configuration of L1 cell change.

This RRC reconfiguration may comprise an indication of a configuration of the target cell(s) prepared by the target DU 403 during 4004 to 4005. For example, this RRC reconfiguration may comprise timing advance (TA) acquisition configurations when CU involvement is to be used. The TA acquisition configuration may comprise at least one trigger condition that, when fulfilled, causes a timing advance value to be obtained in respect of the target cell to which the at least one trigger condition is associated. This may be useful, for example, in providing the UE with early timing information (timing advance) in advance of any decision being made regarding handover of the UE to a target cell. As the timing information may be used for synchronizing the UE's uplink transmission timing with the transmission timing of the target cell in advance of a potential handover, provision of such timing information before a decision is made about handover can result in a shorter interruption time when handover is eventually made compared to when early timing advance information is not provided.

During 4009, the CU 404 signals the source DU 402. This signalling may comprise the RRC reconfiguration generated during 4008. This signalling may comprise a downlink RRC message transfer operation.

During 4010, the source DU 402 forwards the received RRC reconfiguration of 4009 to the UE 401.

During 4011, the UE 401 signals the source DU 402. This signalling may comprise an indication that the RRC reconfiguration received during 4010 has been performed by the UE 401. This signalling may comprise an RRC reconfiguration complete operation.

During 4012, the source DU 402 signals the CU 404. This signalling may forward the received RRC reconfiguration complete indication of 4011 to the CU 404.

4013 to 4018 relate to an execution phase.

During 4013, the UE 401 provides an L1 measurement report to the source DU 402. The L1 measurement report comprises values representing the results of measurements performed by the UE 401 in accordance with the RRC reconfiguration received during 4010.

The L1 measurement report may be provided in accordance with the RRC reconfiguration received by the UE during 4010. The L1 measurement reports may be provided periodically in accordance with the RRC reconfiguration received during 4010.

During 4014, based on the values comprised in the L1 measurement report, the source DU 402 determines to trigger the UE 401 to acquire TA for a set of candidate cells (e.g., candidate cells for becoming a handover target cell). The UE may be triggered by the source DU signalling the UE using a physical downlink control channel (PDCCH).

During 4015, a TA acquisition is performed by the UE 401. The CU 404 may, in some examples, be involved in this TA acquisition. However, it is understood that this is not necessary.

TA acquisition may be performed in any of a plurality of different ways, depending on the configured implementation and scenario. For example, TA may be determined using a receive timing difference-based mechanism, Random Access Channel-less mechanisms (such as in LTE), sounding reference signal (SRS)-based TA acquisition mechanisms, etc. Which TA acquisition mechanism is implemented may be coordinated between the source-DU, CU and/or the candidate target-DUs during the LTM preparation phase (e.g., during 4004 to 4005).

During 4016, the UE signals an L1 measurement report to the source DU 402 (e.g., as per 4013). In other words, the UE 401 continues L1 measurement reporting according to the RRC reconfiguration received during 4010.

During 4017, the source DU 402 determines, based on the values comprised in the L1 measurement report(s) received from the UE, that the UE 401 should be handed over to a cell (e.g., to a target cell) of another DU (e.g., to target DU 403 in the present example).

During 4018, the source DU 402 signals the UE 401 in response to the determination of 4017. This signalling of 4018 may trigger a cell switch (e.g., handover) operation to be performed by the UE 401. The signalling of 4018 may comprise, for example, a cell switch command (e.g., via a MAC control element). In one example, the cell switch command may also comprise a determined TA of the target cell.

4019 to 4020 relate to a random access procedure in which the UE 401 synchronises with the target DU 403.

When 4019 to 4020 relate to a contention free random access procedure, the signalling may comprise, during 4019, the UE 401 signalling a random access preamble to the target DU 402, and the target DU signalling a random access response to this signalling of 4019 during 4020.

When 4019 to 4020 relate to a contention based random access, the signalling may, in addition to signalling the preamble and receiving a response, further comprise a contention resolution phase in which the UE 401 signals uplink during an uplink grant assigned in the random access response, and receive a contention-based response from the target DU.

4019 to 4020 may not be performed in some example implementations. For example, the UE may be configured to not perform random access to the target cell when the UE has already acquired the TA of the target cell.

4021 to 4025 relate to a completion phase.

During 4021, the UE 401 signals the target DU 403. The signalling of 4021 may indicate that the UE has applied the RRC configuration for the target cell of the target DU 403 indicated by the trigger of 4018. The signalling of 4021 may comprise an RRC reconfiguration complete procedure. This signalling of 4021 may be performed using already configured uplink resources to the target cell of target DU.

During 4022, the target DU 403 forwards the RRC reconfiguration complete indication of 4021 to the CU 404. The signalling of 4022 may comprise an uplink RRC message transfer signalling operation.

During 4023, the CU 404 signals the source DU 402. This signalling may comprise an instruction to the source DU 402 to release UE context of UE 401 from the source DU 402. This signalling of 4023 may comprise a UE context release command operation.

During 4024, the source DU 402 signals the CU 404. This signalling of 4024 may be performed when the source DU 402 has released the UE context of UE 401. The signalling of 4024 may comprise a UE context release complete indication to indicate to the CU 404 that the source DU 402 has released the UE context of the UE 401.

During 4025, a path switch operation is performed to route traffic for the UE 401 to the target DU 403 instead of to the source DU 402.

Some of the above example signalling of FIG. 4 relates to the maintenance of uplink time alignment.

For example, the RRC reconfiguration of 4010 may configure the UE with a time alignment timer (TAT) per timing advancement group (TAG). For example, the value of the TAT controls how long the MAC entity at the UE considers the serving cell(s) associated to that TAG to be aligned in time in the uplink.

Subsequently, when a Timing Advance Command MAC control element is received, and when an $N_{TA}$ (as defined in TS 38.211) has been maintained with the indicated TAG, the UE may apply the Timing Advance Command for the indicated TAG, and start or restart the timeAlignmentTimer associated with the indicated TAG. $N_{TA}$ comprises a value representing a Timing Advance between a downlink transmission and an uplink transmission.

Further, when a Timing Advance Command is received in a Random Access Response message for a Serving Cell belonging to a TAG or in an MSGB for an SpCell, and when the Random Access Preamble was not selected by the MAC entity among the contention-based Random Access Preamble, the UE may apply the Timing Advance Command for this TAG, and start or restart the timeAlignmentTimer associated with this TAG. MSGB is a message used as part of a two-step random access procedure, and is sent from a cell to a UE. MSGB may comprise a response to MSGA (mentioned below), such as a random access response to a preamble comprised in MSGA. For example, MSGB may comprise corresponding information and/or functionality as msg2 in a four-step random access procedure. MSGB may comprise contention resolution information. For example, MSGB may comprise corresponding information and/or functionality as msg4 in a four-step random access procedure.

Further, when an Absolute Timing Advance Command is received in response to a MSGA transmission including a cell-radio network temporary identififier (C-RNTI) MAC CE, the UE may apply the Timing Advance Command for Primary Timing Advance Group (PTAG), and start or restart the timeAlignmentTimer associated with PTAG. MSGA is a message used as part of a two-step random access procedure, and is sent from a UE to a cell. MSGA may comprise a preamble for a random access procedure. For example, MSGA may comprise corresponding information and/or functionality as msg1 in a four-step random access procedure. MSGA may comprise physical uplink shared channel information. For example, MSGB may comprise corresponding information and/or functionality as msg3 in a four-step random access procedure.

When a timeAlignmentTimer expires, the UE may perform different actions depending on whether the timeAlignmentTimer is associated with the PTAG or with a Secondary Timing Access Group (STAG).

When the timeAlignmentTimer is associated with the PTAG, the UE may:

flush all hybrid automatic repeat request (HARQ) buffers (e.g., acknowledgement buffers) for all Serving Cells;
notify RRC to release physical uplink control channel (PUCCH) for all Serving Cells, when configured;
notify RRC to release sounding reference signals for all Serving Cells, if configured;
clear any configured downlink assignments and configured uplink grants;
clear any PUSCH resource for semi-persistent CSI reporting;
consider all running timeAlignmentTimers as expired;
maintain $N_{TA}$ of all TAGS.

When the timeAlignmentTimer is associated with the STAG, the UE may:

flush all hybrid automatic repeat request (HARQ) buffers (e.g., acknowledgement buffers);
notify RRC to release physical uplink control channel (PUCCH) for all Serving Cells, when configured;
notify RRC to release sounding reference signals for all Serving Cells, if configured;
clear any configured downlink assignments and configured uplink grants;
clear any PUSCH resource for semi-persistent CSI reporting; and
maintain $N_{TA}$ of all TAGS.

According to current 3GPP agreements on early Timing Advance (TA) acquisition for Rel-18 L1/2-triggered mobility (LTM), the serving cell/DU can trigger the UE to update the TA for a candidate cell by re-acquiring the TA using a RACH-based procedure.

Currently, there is no mechanism in the serving cell to determine when the serving cell should trigger the TA re-acquisition for another (e.g., non-co-located) cell.

After performing random access and acquiring the TA from a serving cell, the UE keeps a TAT for the serving cell. The UE can assume that the acquired TA is valid as long as TAT did not expire. When the UE does not receive a MAC Command from the serving cell instructing the UE to update the TA before TAT expiry, the UE autonomously performs the random access procedure to the serving cell for synchronizing to the serving cell to perform any further uplink transmission (which may be performed, for example, when the UE has uplink traffic to transmit and TAT has expired.

In LTM, when the validity of the acquired TA expires, the UE needs to perform a RACH-based cell change, which will delay the handover and make the early TA acquisition obsolete.

To address at least one of these issues, the following proposes mechanisms for enabling the UE to maintain a valid TA value in respect of a target cell.

In particular, the following describes mechanisms that may be applied when different apparatus are responsible for ensuring that a TA value for a target cell at a UE is valid.

For example, the following provides mechanisms in which a target access node (e.g., a target DU) maintains a procedure for checking when the validity of a TA value provided to a UE for a candidate cell expires and triggers a reacquisition of the TA.

As another example, the following provides mechanisms in which a source access node (e.g., a source DU) maintains a procedure for checking when the validity of a TA value provided to a UE for a candidate cell expires and triggers a reacquisition of the TA.

As another example, the following provides mechanisms in which a UE maintains a procedure for checking when the validity of a TA value provided to a UE for a candidate cell expires and triggers a reacquisition of the TA.

These are illustrated with respect to the example signalling mentioned below in respect of FIGS. 5 to 16.

In general, all of these Figures illustrate examples in which, after a UE is configured with an initial TA value for a target cell (which may be performed, for example, in response to determining that the target cell may soon (although not immediately) be the subject of a mobility operation by the UE), at least one entity monitors a duration of validity of the initial TA value for triggering the UE to acquire a new TA value to replace the initial TA value when the duration of validity expires. The duration of validity is also referred to herein as a validity time.

In addition to determining whether to trigger the acquisition of a new/replacement TA value for the target cell in dependence on this monitored validity time, the following also considers the use of provided measurement reports (e.g., L1 measurement reports) for controlling whether to replace the initial TA value or to simply cause the UE to release the initial TA value. This may be supplemental to monitoring the duration of validity.

After obtaining a new/replacement TA value, the UE may use this new/replacement TA value for synchronizing with the target cell in the event of a mobility operation being performed (e.g., a handover, a cell change, and/or a cell addition to the target cell). The UE may use the new/replacement TA value in such a way when a current measurement made of a signal provided by the target cell triggers the mobility operation to be performed (whether by instruction from a source node, and/or autonomously by the UE, such as for conditional mobility operations).

Figure 5:
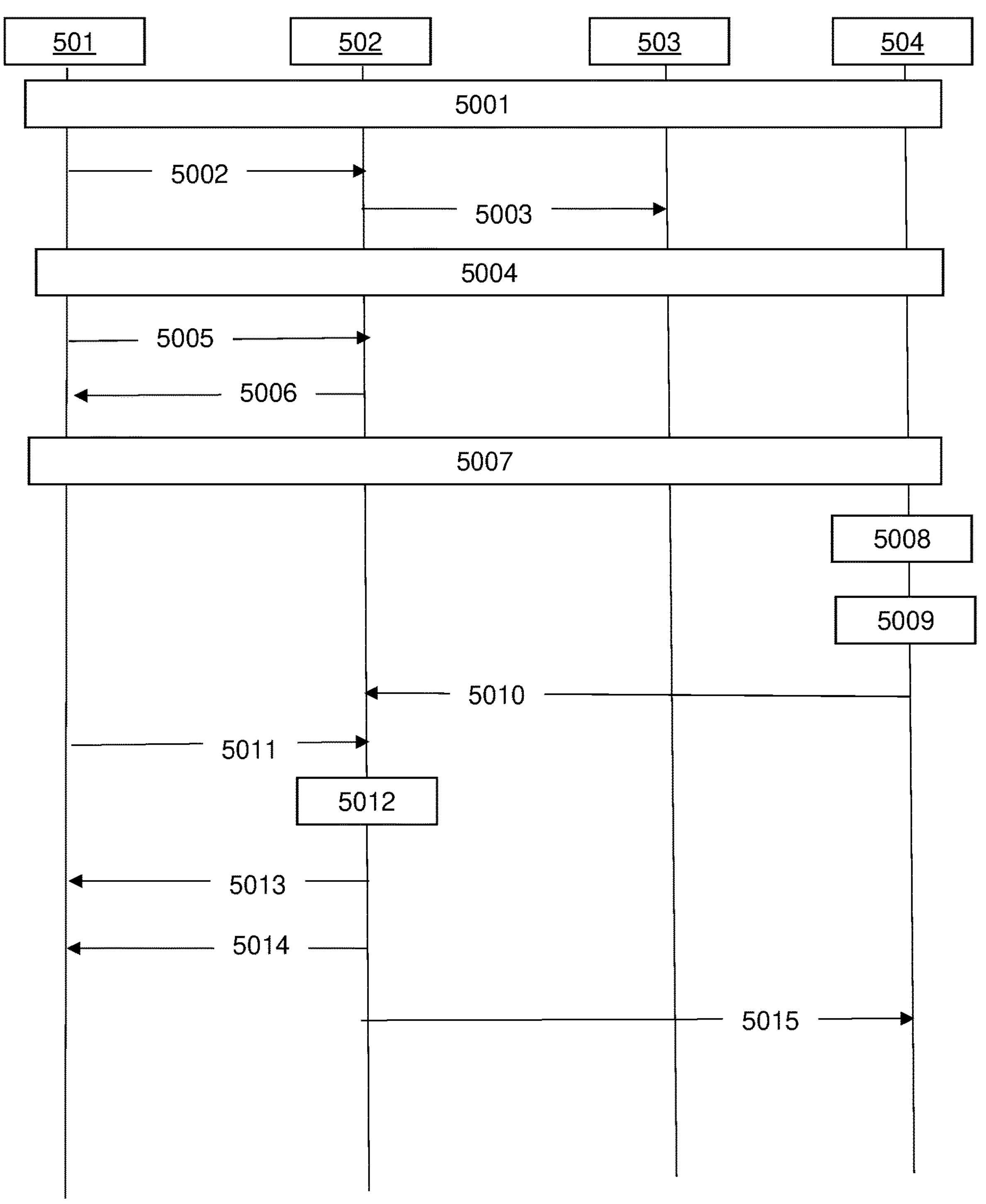
FIGS. 5 to 8 illustrate example signalling.

FIG. 5 illustrates signalling that may be performed in an example in which a target DU maintains a procedure for checking the validity of an acquired TA for a candidate cell, and for triggering the reacquisition of the TA when desired.

FIG. 5 illustrates signalling that may be performed between a UE 501, a first DU 502, a CU 503, and a second DU 503. The first DU provides a first cell and a second cell. The second DU provides a third cell.

During 5001, the UE 501 establishes a connection towards the first cell. This means that the UE 501 can receive data from a network via the first cell. From 5001, the first cell is a current serving cell of UE 501, and the first DU may be considered as a source DU.

During 5002, the UE 501 signals an L3 measurement report to the first DU 502. This may be as described above in relation to 4001.

During 5003, the first DU 502 forwards the L3 measurement report of 5002 to the CU 503. This may be as described above in relation to 4002.

During 5004, the UE is configured with an LTM configuration in respect of the second and third cells. The second and third cells may be considered candidate target cells. Although not shown, this may be as described above in relation to 4003 to 4012.

During 5005, the UE 501 signals L1 beam measurements to the first DU 502. This may be performed in accordance with the RRC reconfiguration signalled between 4003 and 4012.

During 5006, the first DU 502 signals the UE 501. This signalling may comprise an instruction to the UE to instruct the UE to obtain a timing advance for the third cell. The signalling of 5006 may be signalled using a Physical Downlink Control Channel (PDCCH). The signalling of 5006 may be performed in response to the received L1 beam measurements of 5005. For example, based on the received measurements of 5005, the first DU may determine that the third cell is a possible handover candidate for the UE in the near future, and cause the UE to obtain a timing advance in respect of the third cell in response to that determination. This process may also be referred to as early timing advance.

During 5007, the UE 501 performs a TA procedure to acquire a TA of the third cell. Any mechanism for obtaining a TA of the third cell may be used during 5007. Some example TA mechanisms are mentioned further below.

The second DU 504 may send the TA associated with the third cell to the UE 501 directly over the second DU 504's radio link, and/or indirectly via the first DU 502.

During 5008, the second DU 504 starts running a timer, T after providing the UE 501 with a timing advance value for the third cell. The timer, T, may have a duration that represents a validity of the timing advance value. The expiry of the timer, T, may indicate that the timing advance value is no longer valid. The value of the timer may be set by a network configuration (e.g., a network may configure the UE with a value setting the duration of the timer).

During 5009, the second DU 504 determines to trigger the source node to instruct the UE to re-acquire a timing advance for the third cell. 5009 may be performed before or on expiry of timer, T.

During 5010, the second DU 504 signals the first DU 502. This signalling may indicate that the timing advance value for the third cell should be reacquired by the UE 501. In other words, this signalling may indicate that the timing advance value for the third cell is no longer valid. This signalling may be routed through the CU 503.

During 5011, the UE signals L1 beam measurement results to the first DU 502.

During 5012, the first DU 502 determines, from the received L1 beam measurements, what the current radio conditions are for the third cell from the UE's perspective. Depending on the third cell's current radio conditions, the first DU 502 may signal 5013 or 5014 to the UE 501.

5013 may be performed when the third cell's current radio conditions indicates that the third cell is a good handover candidate for the UE 501. During 5013, the first DU 502 signals the UE 501. The signalling of 5013 may comprise an instruction to the UE to instruct the UE to obtain a timing advance for the third cell. The signalling of 5013 may be signalled using a PDCCH. Although not shown, the UE may revert to 5007.

5014 may be performed when the third cell's current radio conditions indicates that the third cell is not a good handover candidate for the UE 501. In other words, 5014 may be performed when the first DU 501 determined from at least one L1 measurement report received from the UE that the radio conditions of the third cell are no longer sufficient for the third cell to be a candidate target cell (e.g., an L1 reference signal received power (RSRP) of the third cell (or some corresponding metric)<a predetermined threshold).

During 5014, the first DU 502 signals the UE 501. The signalling of 5014 may instruct the UE to remove any previously stored TA value for the third cell. Although not shown, the UE 501 may remove this previously stored TA value that was acquired during 5007. The UE 501 may continue to maintain the third cell as a potential handover candidate while releasing the previously stored TA value.

During 5015, the first DU 502 signals the second DU 504. This signalling may comprise an acknowledgement or negative acknowledgement to the signalling of 5013. An acknowledgement may be signalled when 5013 is signalled, and indicate that the third cell provides a sufficient radio signal for acquiring a TA value. A negative acknowledgement may be signalled when 5014 is signalled, and indicate that the third cell does not provide a sufficient radio signal for acquiring a TA value. The sufficiency (or otherwise) of a radio signal may be assessed in relation to a radio signal's strength and/or quality.

Figure 6:
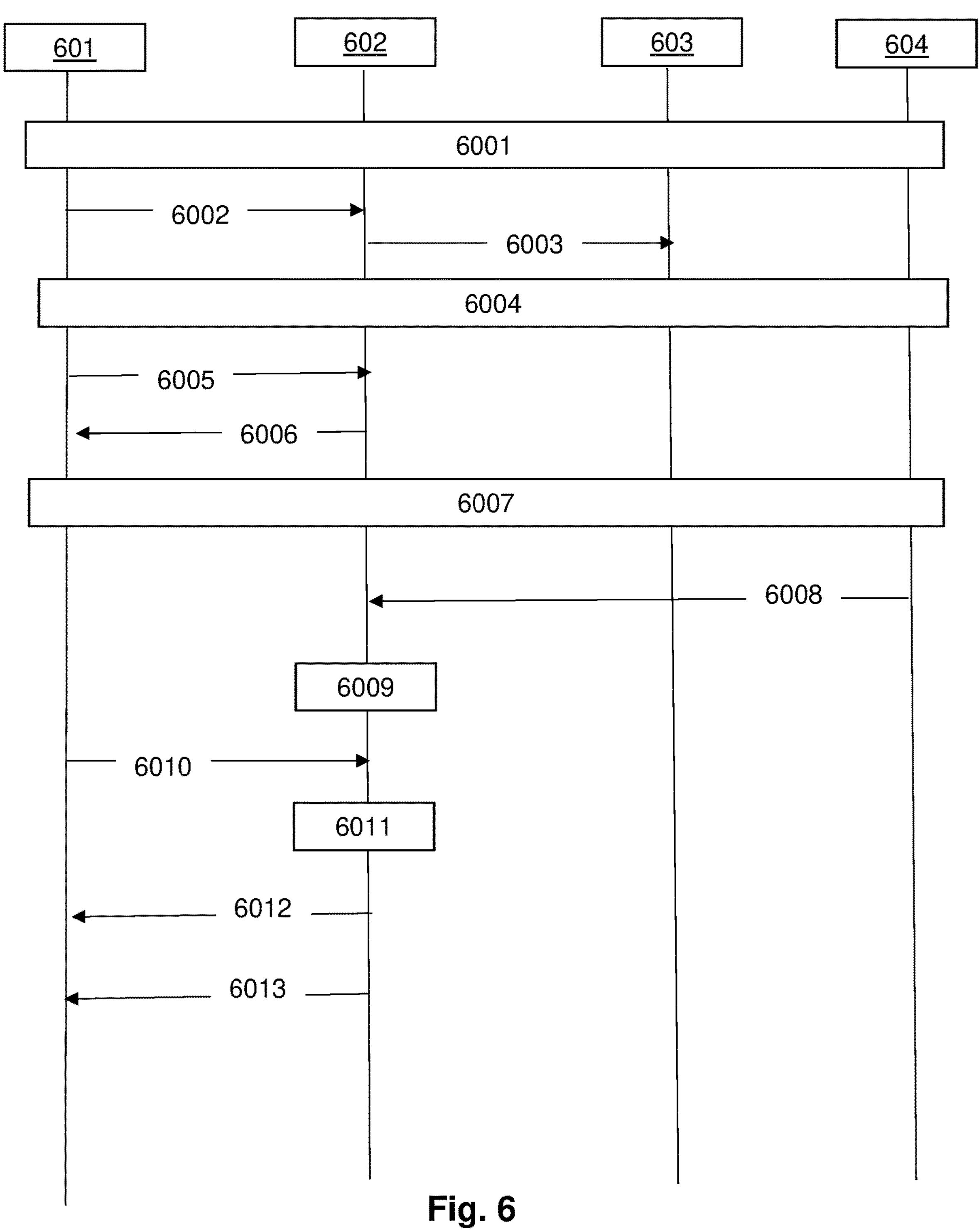

FIG. 6 illustrates signalling that may be performed in an example in which a source DU maintains a procedure for checking the validity of an acquired TA for a candidate cell, and for triggering the reacquisition of the TA when desired.

FIG. 6 illustrates signalling that may be performed between a UE 601, a first DU 602, a CU 603, and a second DU 603. The first DU provides a first cell and a second cell. The second DU provides a third cell. The first cell is a current serving cell of UE 601.

During 6001, the UE 601 establishes a connection towards the first cell. This means that the UE 601 can receive data from a network via the first cell. From 6001, the first cell is a current serving cell of UE 601, and the first DU may be considered as a source DU.

During 6002, the UE 601 signals an L3 measurement report to the first DU 602. This may be as described above in relation to 4001.

During 6003, the first DU 602 forwards the L3 measurement report of 6002 to the CU 603. This may be as described above in relation to 4002.

During 6004, the UE is configured with an LTM configuration in respect of the second and third cells. The second and third cells may be considered candidate target cells. Although not shown, this may be as described above in relation to 4003 to 4012.

During 6005, the UE 601 signals L1 beam measurements to the first DU 602. This may be performed in accordance with the RRC reconfiguration signalled between 4003 and 4012.

During 6006, the first DU 602 signals the UE 601. This signalling may comprise an instruction to the UE to instruct the UE to obtain a timing advance for the third cell. The signalling of 6006 may be signalled using a Physical Downlink Control Channel (PDCCH). This may be as described above in relation to FIG. 5.

During 6007, the UE 601 performs a TA procedure to acquire a TA of the third cell.

The second DU 604 may send the TA associated with the third cell to the UE 601 directly over the second DU 604's radio link, and/or indirectly via the first DU 602.

During 6008, the second DU 604 signals the first DU 602. This signalling may comprise an indication of when the timing advance value for the third cell should be reacquired by the UE 601. For example, this signalling may comprise an indication of a value of a time at which the timing advance value will be considered invalid.

In one example, the value of time duration may be sent by the second DU to the first DU when the TA has been delivered to the UE or first cell (e.g., during 6007). This signalling may be routed through the CU 603.

In one example, the value of the time duration may be sent to the first DU 601 by the second DU 604 during the preparation of the third cell as a candidate cell in the second DU. This signalling may be routed through the CU 603.

In one example, the value of the time duration indicated by the CU to the first DU 602.

During 6009, the first DU 602 runs a timer that, on expiry, indicates that the timing advance value of the third cell is expired, or will soon be expired.

During 6010, the UE signals L1 beam measurement results to the first DU 602.

During 6011, the first DU 602 determines, from the received L1 beam measurements, what the current radio conditions are for the third cell from the UE's perspective. Depending on the third cell's current radio conditions, the first DU 602 may signal 6012 or 6013 to the UE 601 when the value of the timer indicates that the timing advance value of the third cell is expired or will soon be expired.

6012 may be performed when the third cell's current radio conditions indicate that the third cell is a good handover candidate for the UE 601. During 6012, the first DU 602 signals the UE 601. The signalling of 6012 may comprise an instruction to the UE to instruct the UE to obtain a timing advance for the third cell. The signalling of 6012 may be signalled using a PDCCH. Although not shown, the UE may revert to 6007.

6013 may be performed when the third cell's current radio conditions indicate that the third cell is not a good handover candidate for the UE 601. In other words, 6013 may be performed when the first DU 601 determined from at least one L1 measurement report received from the UE that the radio conditions of the third cell are no longer sufficient for the third cell to be a candidate target cell (e.g., an L1 reference signal received power (RSRP) of the third cell (or some corresponding metric)<a predetermined threshold).

During 6013, the first DU 602 signals the UE 601. The signalling of 6013 may instruct the UE to remove any previously stored TA value for the third cell. Although not shown, the UE 601 may remove this previously stored TA value that was acquired during 6007.

Figure 7:
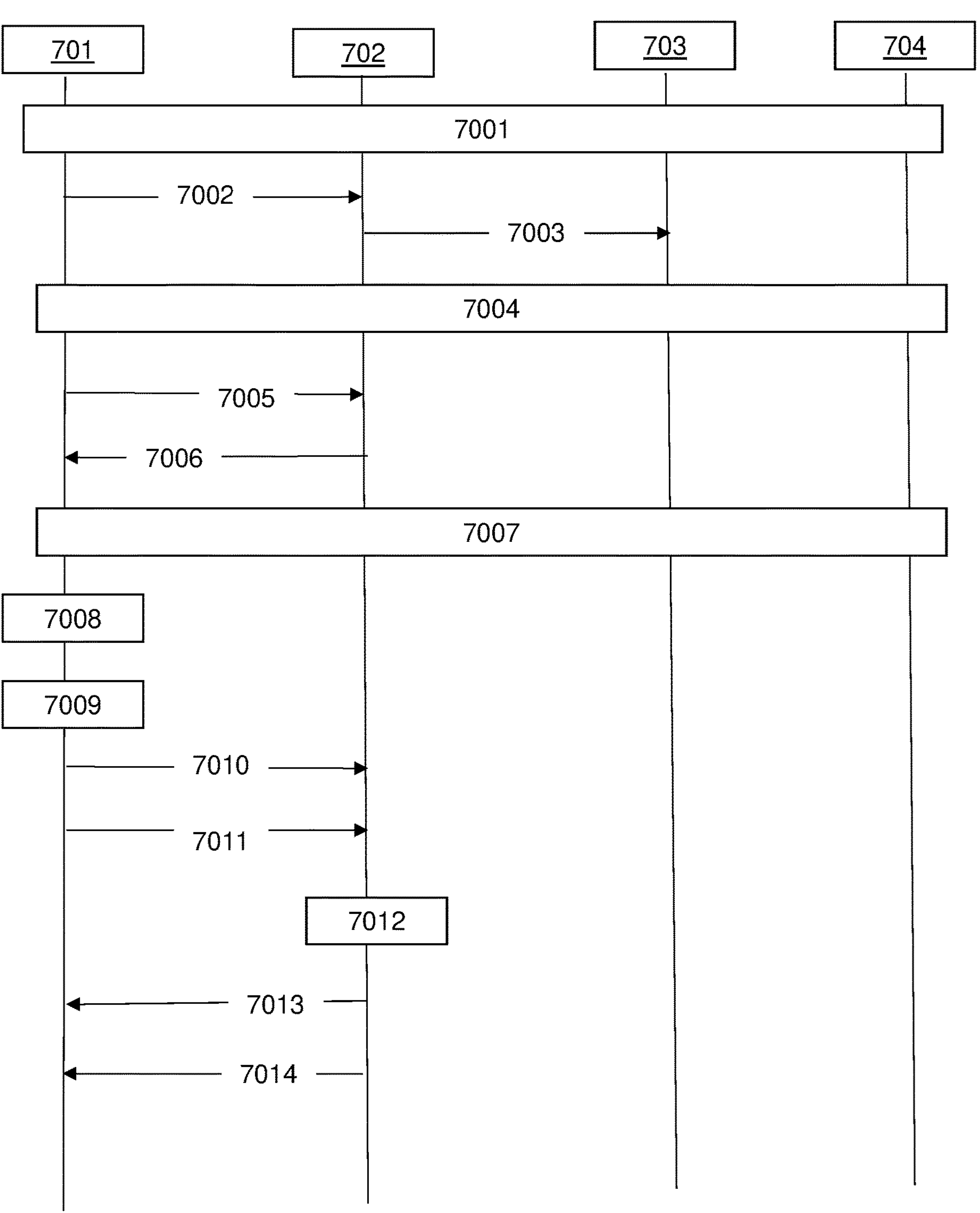

FIG. 7 illustrates signalling that may be performed in an example in which a UE maintains a procedure for checking the validity of an acquired TA for a candidate cell, and for triggering the reacquisition of the TA when desired.

FIG. 7 illustrates signalling that may be performed between a UE 701, a first DU 702, a CU 703, and a second DU 703. The first DU provides a first cell and a second cell. The second DU provides a third cell. The first cell is a current serving cell of UE 701.

During 7001, the UE 701 establishes a connection towards the first cell. This means that the UE 701 can receive data from a network via the first cell. From 7001, the first cell is a current serving cell of UE 701, and the first DU may be considered as a source DU.

During 7002, the UE 701 signals an L3 measurement report to the first DU 702. This may be as described above in relation to 4001.

During 7003, the first DU 702 forwards the L3 measurement report of 7002 to the CU 703. This may be as described above in relation to 4002.

During 7004, the UE is configured with an LTM configuration in respect of the second and third cells. The second and third cells may be considered candidate target cells. Although not shown, this may be as described above in relation to 4003 to 4012.

During 7005, the UE 701 signals L1 beam measurements to the first DU 702. This may be performed in accordance with the RRC reconfiguration signalled between 4003 and 4012.

During 7006, the first DU 702 signals the UE 701. This signalling may comprise an instruction to the UE to instruct the UE to obtain a timing advance for the third cell. The signalling of 7006 may be signalled using a Physical Downlink Control Channel (PDCCH). This signalling may be as described above in relation to FIG. 5.

During 7007, the UE 701 performs a TA procedure to acquire a TA of the third cell.

The second DU 704 may send the TA associated with the third cell to the UE 701 directly over the second DU 704's radio link, and/or indirectly via the first DU 702.

During 7008, the UE 801 implements a timer. The timer may be initialized to a value of a time at which the timing advance value will be considered invalid. The timer may therefore expire when the timing advance value is considered invalid.

In one example, the value of time duration may be sent by the second DU to the UE when the TA is delivered to the UE or first cell (e.g., during 7007).

In one example, the value of the time duration may be sent to the UE 701 by the second DU 704 during the preparation of the third cell as a candidate cell at the UE 701.

In one example, the value of the time duration is indicated by the CU to the UE 701.

During 7009, the UE determines that the timer has expired or is approaching expiry.

In response to the determination of 7009, during 7010 the UE signals, to the first DU 702, and indication that the timing advance value of the third cell is invalid.

During 7011, the UE 701 signals L1 beam measurement results to the first DU 702.

During 7012, in response to the signalling of 7010 and 7011, the first DU 702 determines, from the received L1 beam measurements, what the current radio conditions are for the third cell from the UE's perspective. Depending on the third cell's current radio conditions, the first DU 702 may signal 7013 or 7014 to the UE 701.

7013 may be performed when the third cell's current radio conditions indicate that the third cell is a good handover candidate for the UE 701. During 7013, the first DU 702 signals the UE 701. The signalling of 7013 may comprise an instruction to the UE to instruct the UE to obtain a timing advance for the third cell. The signalling of 7013 may be signalled using a PDCCH. Although not shown, the UE may revert to 7007.

7014 may be performed when the third cell's current radio conditions indicate that the third cell is not a good handover candidate for the UE 701. In other words, 7014 may be performed when the first DU 701 determined from at least one L1 measurement report received from the UE that the radio conditions of the third cell are no longer sufficient for the third cell to be a candidate target cell (e.g., an L1 reference signal received power (RSRP) of the third cell (or some corresponding metric)<a predetermined threshold).

During 7014, the first DU 702 signals the UE 701. The signalling of 7014 may instruct the UE to remove any previously stored TA value for the third cell. Although not shown, the UE 701 may remove this previously stored TA value that was acquired during 7007.

In this example of FIG. 7, a UE informs a source DU about the invalidity of the acquired TA for a specific candidate cell. The UE may receive the time duration T1 of the timer T for maintaining the validity of the acquired TA from the network. The time duration T1 can be specific to each candidate cell. In other words, the time duration T1 can be specific to each target cell. The UE may start a timer T with the duration T1 after acquiring a TA of a candidate (e.g., target) cell.

The UE may acquire a TA of a candidate cell in response to an instruction to do so from the network (e.g., from the source DU).

The network may instruct the UE to acquire the TA when the network determines that the UE is likely to perform a handover (or some other mobility procedure) to the candidate cell in the near future (e.g., not immediately in response to obtaining the TA). It is understood that the UE may or may not perform a handover (or some other mobility operation) in respect of the candidate cell, in dependence on later measurements made by the UE of a signal transmitted by the candidate cell.

The UE may inform the source DU about the invalidity of TA before/or upon expiry of timer T. Using the received information, the serving DU may either trigger the UE to either 1) re-acquire the TA for a candidate cell that is controlled by the target DU providing the candidate cell, or 2) to drop the TA that is acquired for the candidate cell.

Figure 8:
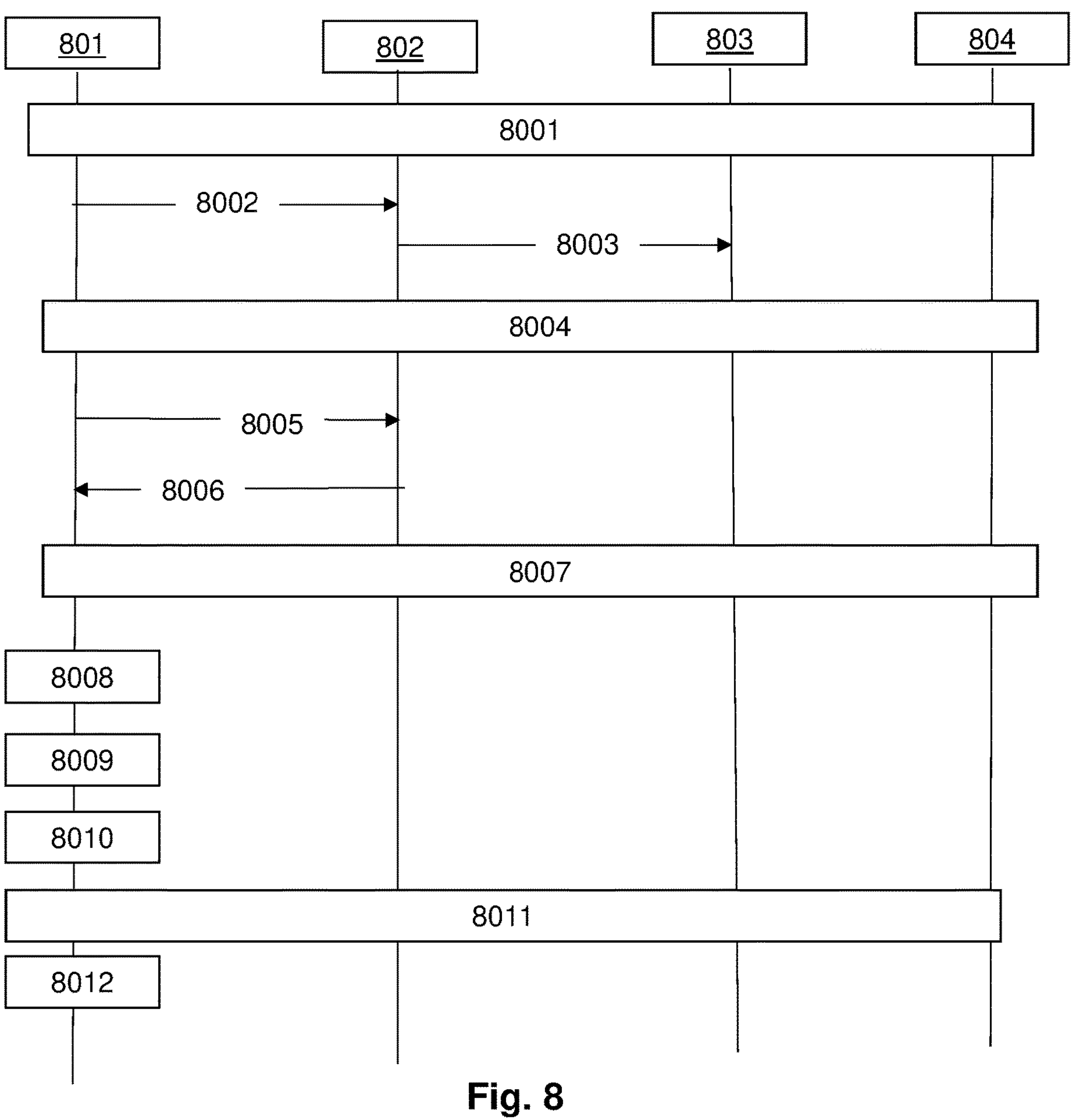

FIG. 8 illustrates signalling that may be performed in an example in which a UE maintains a procedure for checking the validity of an acquired TA for a candidate cell, and for triggering the reacquisition of the TA when desired.

FIG. 8 illustrates signalling that may be performed between a UE 801, a first DU 802, a CU 803, and a second DU 803. The first DU provides a first cell and a second cell. The second DU provides a third cell. The first cell is a current serving cell of UE 801.

FIG. 8 illustrates signalling that may be performed in an example in which a UE maintains a procedure for checking the validity of an acquired TA for a candidate cell, and for triggering the reacquisition of the TA when desired.

FIG. 8 illustrates signalling that may be performed between a UE 801, a first DU 802, a CU 803, and a second DU 803. The first DU provides a first cell and a second cell. The second DU provides a third cell. The first cell is a current serving cell of UE 801.

During 8001, the UE 801 establishes a connection towards the first cell. This means that the UE 801 can receive data from a network via the first cell. From 8001, the first cell is a current serving cell of UE 801, and the first DU may be considered as a source DU.

During 8002, the UE 801 signals an L3 measurement report to the first DU 802. This may be as described above in relation to 4001.

During 8003, the first DU 802 forwards the L3 measurement report of 8002 to the CU 803. This may be as described above in relation to 4002.

During 8004, the UE is configured with an LTM configuration in respect of the second and third cells. The second and third cells may be considered candidate target cells. Although not shown, this may be as described above in relation to 4003 to 4012.

During 8005, the UE 801 signals L1 beam measurements to the first DU 802. This may be performed in accordance with the RRC reconfiguration signalled between 4003 and 4012.

During 8006, the first DU 802 signals the UE 801. This signalling may comprise an instruction to the UE to instruct the UE to obtain a timing advance for the third cell. The signalling does not need to instruct the UE to obtain a timing advance for the second cell as the first DU 802 provides the second cell and is aware of its timing. The signalling of 8006 may be signalled using a Physical Downlink Control Channel (PDCCH). This signalling may be as described above in relation to FIG. 5.

During 8007, the UE 801 performs a TA procedure to acquire a TA of the third cell.

The second DU 804 may send the TA associated with the third cell to the UE 801 directly over the second DU 804's radio link, and/or indirectly via the first DU 802.

During 8008, the UE 801 implements a timer. The timer may be initialized to a value of a time at which timing advance value will be considered invalid. The timer may therefore expire when the timing advance value is considered invalid.

In one example, the value of time duration may be sent by the second DU to the UE when the TA is delivered to the UE or first cell (e.g., during 8007).

In one example, the value of the time duration may be sent to the UE 801 by the second DU 804 during the preparation of the third cell as a candidate cell at the UE 801.

In one example, the value of the time duration indicated by the CU to the UE 801.

During 8009, the UE determines that the timer has expired or is approaching expiry.

In response to the determination of 8009, during 8010 the UE determines, from beam measurements, what the current radio conditions are for the third cell from the UE's perspective. The beam measurements may comprise L1 and/or L3 beam measurements. Depending on the third cell's current radio conditions, the UE 801 may perform 8011 or 8012.

8011 may be performed when the third cell's current radio conditions indicate that the third cell is a good handover candidate for the UE 801. During 8011, the UE autonomously initiates obtaining a new timing advance for the third cell.

During 8011, the UE may use a previously utilized TA mechanism for obtaining the new timing advance for the third cell.

For example, when the Contention Free Random Access (CFRA) was performed for the previous TA acquisition of the candidate cell, the UE 801 may use the same RACH configuration (e.g., RA preamble, RACH occasion, etc.) during 8011. For example, the CFRA configuration that was used during 8007 for the acquisition of the TA may also be used during 8011. This may be the case when the UE has the similar radio condition during 8011 as during 8007 (e.g., a same Synchronization Signal Block (SSB) that is associated with a CFRA preamble can be received with a sufficient quality (Reference Signal Received Power (RSRP) greater than a threshold amount).

Similarly, in another example, the UE may perform Contention-based Random Access (CBRA) for TA re-acquisition using the CBRA configuration previously sent to the UE during the preparation of the candidate cell.

8012 may be performed when the third cell's current radio conditions indicates that the third cell is not a good handover candidate for the UE 801. In other words, 8012 may be performed when the UE determined from at least one L1 measurement that the radio conditions of the third cell are no longer sufficient for the third cell to be a candidate target cell (e.g., an L1 reference signal received power (RSRP) of the third cell (or some corresponding metric)<a predetermined threshold).

During 8012, UE removes any previously stored TA value for the third cell.

Features of the above described examples are highlighted below in relation to FIGS. 9 to 16. These highlighted features may therefore find correspondence in at least one of the examples provided above. The above-mentioned examples may therefore be combined with at least one of the following described. It is also noted that although the following indicates that some apparatus are interacting, that these apparatus are not limited to only interacting with each other, and that various other combinations of apparatus may exchange signalling with each other.

FIGS. 9 and 10 illustrate features that may be performed by interacting apparatus.

FIG. 9 illustrates operations that may be performed by a first access node. The first access node may be an entity that provides a user equipment with access to a network. The first access node may signal traffic to and/or from the user equipment. The first access node may be a distributed unit. The first access node may be a gNB.

During 901, the first access node establishes a connection towards a user equipment via a serving cell supported by the first access node. The connection may comprise a user plane connection.

During 902, the first access node instructs the user equipment to obtain a first timing advance value for a target cell supported by a second access node, wherein the first timing advance value indicates a timing for transmitting uplink transmissions to the target cell.

This instructing may be performed in response to the first access node determining that it may soon be useful for the user equipment to perform a cell mobility operation (e.g., a handover, a cell addition, and/or cell change operation) in respect of the target cell. The determining that it may soon be useful for the user equipment to perform a cell mobility operation may be dependent on receipt of a measurement report (e.g., an L1 measurement report) received from the user equipment that indicates that a quality and/or power of a signal of the target cell has reached a minimum threshold level.

The second access node may be a different access node to the first access node.

During 903, the first access node receives, from the second access node, an indication that the first timing advance value is or will soon be invalid. This receiving may be performed subsequent to 902.

The indication may comprise an explicit indication that the first timing advance value is or will soon be invalid. For example, the indication may comprise a field that may take one of two values, with one value indicating that the first timing advance value is or will soon be invalid.

During 904, the first access node determines whether to instruct the user equipment to obtain a second timing advance value for the target cell in dependence on the received indication, the second timing advance value being obtained later in time than the first timing advance value.

The first access node may perform any instructing in accordance with the result of the determination of 904.

The first access node may receive, from the user equipment, a first indication of a current strength and/or quality of a signal of the target cell received by the user equipment. In such a case, the determining whether to instruct the user equipment may further comprise determining to instruct the user equipment to obtain the second timing advance value when the first indication indicates that the current strength and/or quality of the signal provided by the target cell received by the user equipment has increased above a predetermined threshold.

The first access node may receive, from the user equipment, a first indication of a current strength and/or quality of a signal of the target cell received by the user equipment. In such a case, the determining whether to instruct the user equipment may comprise: determining to instruct the user equipment to release the first timing advance value when the first indication indicates that the current strength and/or quality of the target cell received by the user equipment is below or equal to a predetermined threshold. The instructing may cause the user equipment to release the first timing advance level while continuing to perform (and report to the first access node) measurements (e.g., layer 1 measurements) on the signal provided by the target cell.

The first access node may receive, from the user equipment, the first indication in a layer 1 measurement report.

The indication of when the first timing advance value is or will be no longer valid for the user equipment to transmit uplink to the target cell may be received indirectly from the second access node via a centralized unit.

The first access node may signal a response to the indication that the first timing advance value is or will soon be invalid. The response may comprise an indication as to whether the user equipment has been instructed to re-acquire the timing advance of the target cell.

The instructing the user equipment to obtain the first timing advance value may be performed in response to: receiving, from the user equipment, a layer 1 measurement report indicating that a strength and/or quality of a signal provided by the target cell is above a preconfigured threshold.

The first access node may determine, from a second indication of a current strength and/or quality of the target cell received from the user equipment (e.g., via an L1 measurement report), that the user equipment is to be handed over to a target cell, and cause the user equipment to be handed over to (or perform some other mobility operation in respect of) the target cell in response to said determination. The handover and/or mobility operation may be performed utilizing the second timing advance value.

FIG. 10 illustrates operations that may be performed by a second access node. The second access node may correspond to the second access node mentioned in relation to FIG. 9. The second access node may be an entity that can provide a user equipment with access to a network but which has not yet established a connection with the user equipment. The second access node may be a target access node. The second access node may be a distributed unit. The second access node may be a gNB.

During 1001, the second access node causes a first timing advance value to be provided to a user equipment for enabling the user equipment to synchronize uplink transmissions to a timing of a target cell supported by the second access node. This may be performed according to any method for providing a timing advance value to a user equipment.

During 1002, the second access node determines a validity time of the first timing advance value, wherein, the first timing advance value is considered invalid after the validity time. The validity time may be preconfigured at the second access node prior to causing the first timing advance value to be provided to the user equipment. The validity time may be determined when causing the first timing advance value to be provided to the user equipment.

During 1003, the second access node signals, to a first access node supporting a serving cell connected to the user equipment, an indication that the first timing advance value is or will soon be invalid before or on expiry of the validity time. The first access node may be the first access node mentioned above in connection with FIG. 9. The indication may comprise an explicit indication that the first timing advance value is or will soon be invalid. For example, the indication may comprise a field that may take one of two values, with one value indicating that the first timing advance value is or will soon be invalid.

The second access node may receive a response to the indication that the first timing advance value is or will soon be invalid, the response comprising an indication as to whether the user equipment has been instructed to re-acquire the timing advance of the target cell.

The response may indicate that the user equipment has been instructed to re-acquire the timing advance of the target cell, and the second access node may cause a second timing advance value to be provided to the user equipment for enabling the user equipment to synchronize uplink transmissions to a timing of a target cell supported by the second access node. This second timing advance value may be provided to the user equipment in the same way in which the first timing advance value was provided to the user equipment.

FIGS. 11 and 12 illustrate another pair of interacting apparatus.

FIG. 11 illustrates operations that may be performed by a first access node. The first access node may be an entity that provides a user equipment with access to a network. The first access node may signal traffic to and/or from the user equipment. The first access node may be a distributed unit. The first access node may be a gNB.

During 1101, the first access node establishes a connection towards a user equipment via a serving cell supported by the first access node. The connection may comprise a user plane connection.

During 1102, the first access node instructs the user equipment to obtain a first timing advance value for a target cell supported by a second access node, wherein the first timing advance value indicates a timing for transmitting uplink transmissions to the target cell.

This instructing may be performed in response to the first access node determining that it may soon be useful for the user equipment to perform a cell mobility operation (e.g., a handover, a cell addition, and/or cell change operation) in respect of the target cell. The determining that it may soon be useful for the user equipment to perform a cell mobility operation may be dependent on receipt of a measurement report (e.g., an L1 measurement report) received from the user equipment that indicates that a quality and/or power of a signal of the target cell has reached a minimum threshold level.

The second access node may be a different access node to the first access node.

During 1103, the first access node receives, from the second access node, an indication of when the first timing advance value will be invalid. This signalling of 1103 may be received after 1102.

During 1104, the first access node uses the indication of when the first timing advance value will be invalid to determine that the first timing advance value is or will soon be invalid. The first access node may make the determination of 1104 autonomously, using the information comprised in the received indication.

During 1105, the first access node determines in response to said using, whether to instruct the user equipment to obtain a second timing advance value for the target cell, the second timing advance value being obtained later in time than the first timing advance value.

The first access node may perform any instructing in accordance with the result of the determination of 1105.

The first access node may receive, from the user equipment, a first indication of a current strength and/or quality of a signal of the target cell received by the user equipment. In such a case, the determining whether to instruct the user equipment may comprise: determining to instruct the user equipment to obtain the second timing advance value when the first indication indicates that the current strength and/or quality of the signal provided by the target cell received by the user equipment has increased above a predetermined threshold.

The first access node may receive, from the user equipment, a first indication of a current strength and/or quality of a signal of the target cell received by the user equipment. In such a case, the determining whether to instruct the user equipment may comprise: determining to instruct the user equipment to release the first timing advance value when the first indication indicates that the current strength and/or quality of the signal provided by the target cell received by the user equipment is below or equal to a predetermined threshold. The instructing may cause the user equipment to release the first timing advance level while continuing to perform (and report to the first access node) measurements (e.g., layer 1 measurements) on the signal provided by the target cell.

The first access node may receive, from the user equipment, the first indication in a layer 1 measurement report.

The indication of when the first timing advance value will be invalid for the user equipment to transmit uplink to the target cell may be received indirectly from the second access node via a centralized unit.

The indication of when the first timing advance value will be invalid may comprise a timer value. In such a case, the first access node may start a timer using the timer value (e.g., initialize a timer using the timer value such that the timer expires at a time duration correspondent to the timer value), and determine that the first timing advance value is or will soon be invalid in response to expiry of the timer.

The instructing the user equipment to obtain the first timing advance value may be performed in response to: receiving, from the user equipment, a layer 1 measurement report indicating that a strength and/or quality of a signal provided by the target cell is above a preconfigured threshold.

The first access node may determine, from a second indication of a current strength and/or quality of the target cell received from the user equipment (e.g., via an L1 measurement report), that the user equipment is to be handed over to a target cell, and cause the user equipment to be handed over to (or perform some other mobility operation in respect of) the target cell in response to said determination. The handover and/or mobility operation may be performed utilizing the second timing advance value.

FIG. 12 illustrates operations that may be performed by a second access node. The second access node may correspond to the second access node mentioned in relation to FIG. 11. The second access node may be an entity that can provide a user equipment with access to a network but which has not yet established a connection with the user equipment. The second access node may be a target access node. The second access node may be a distributed unit. The second access node may be a gNB.

During 1201, the second access node causes a first timing advance value to be provided to a user equipment for enabling the user equipment to synchronize uplink transmissions to a timing of a target cell supported by the second access node. This may be performed according to any method for providing a timing advance value to a user equipment.

During 1202, the second access node determines a validity time of the first timing advance value, wherein, the first timing advance value is considered invalid after the validity time. The validity time may be preconfigured at the second access node prior to causing the first timing advance value to be provided to the user equipment. The validity time may be determined when causing the first timing advance value to be provided to the user equipment.

During 1203, the second access node signals, to a first access node supporting a serving cell connected to the user equipment, said validity time. This signalling of 1203 may explicitly comprise a value of said validity time. This validity time value may be represented as an absolute time (e.g., in relation to a universal time). This validity time value may be represented as a relative time (e.g., in relation to a time of transmission of the time value and/or in relation to a current universal time).

Figure 13:
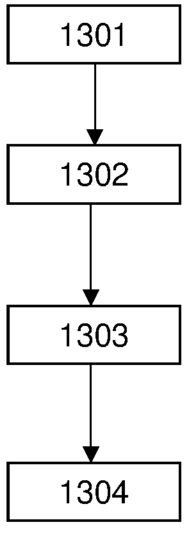
Figure 14:
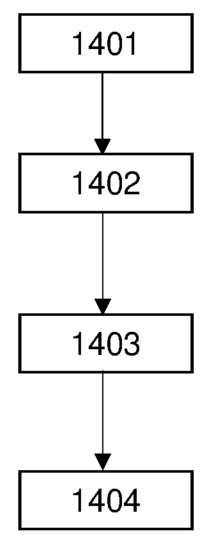

FIGS. 13 and 14 illustrate another pair of interacting apparatus.

FIG. 13 illustrates operations that may be performed by a first access node. The first access node may be an entity that provides a user equipment with access to a network. The first access node may signal traffic to and/or from the user equipment. The first access node may be a distributed unit. The first access node may be a gNB.

During 1301, the first access node establishes a connection towards a user equipment via a serving cell supported by the first access node. The connection may comprise a user plane connection.

During 1302, the first access node instructs the user equipment to obtain a first timing advance value for a target cell supported by a second access node, wherein the first timing advance value indicates a timing for transmitting uplink transmissions to the target cell.

This instructing may be performed in response to the first access node determining that it may soon be useful for the user equipment to perform a cell mobility operation (e.g., a handover, a cell addition, and/or cell change operation) in respect of the target cell. The determining that it may soon be useful for the user equipment to perform a cell mobility operation may be dependent on receipt of a measurement report (e.g., an L1 measurement report) received from the user equipment that indicates that a quality and/or power of a signal of the target cell has reached a minimum threshold level.

The second access node may be a different access node to the first access node.

During 1303, the first access node receives, from the user equipment, an indication that the first timing advance value is or will soon be invalid. The indication may comprise an explicit indication that the first timing advance value is or will soon be invalid. For example, the indication may comprise a field that may take one of two values, with one value indicating that the first timing advance value is or will soon be invalid.

During 1304, the first access node determines whether to instruct the user equipment to obtain a second timing advance value for the target cell in dependence on the received indication, the second timing advance value being obtained later in time than the first timing advance value.

The first access node may perform any instructing in accordance with the result of the determination of 1304.

The first access node may receive, from the user equipment, a first indication of a current strength and/or quality of a signal of the target cell received by the user equipment. In such a case, the determining whether to instruct the user equipment may comprise: determining to instruct the user equipment to obtain the second timing advance value when the first indication indicates that the current strength and/or quality of the signal of the target cell received by the user equipment has increased above a predetermined threshold.

The first access node may receive, from the user equipment, a first indication of a current strength and/or quality of a signal of the target cell received by the user equipment. In such a case the determining whether to instruct the user equipment may comprise: determining to instruct the user equipment to release the first timing advance value when the first indication indicates that the current strength and/or quality of the signal of the target cell received by the user equipment is below or equal to a predetermined threshold. The instructing may cause the user equipment to release the first timing advance level while continuing to perform (and report to the first access node) measurements (e.g., layer 1 measurements) on the signal provided by the target cell.

The first indication of a current strength and/or quality of a signal of the target cell may be received in a layer 1 measurement report.

The instructing the user equipment to obtain the first timing advance value may be performed in response to: receiving, from the user equipment, a layer 1 measurement report indicating that a strength and/or quality of a signal provided by the target cell is above a preconfigured threshold.

The first access node may determine, from a second indication of a current strength and/or quality of the target cell received from the user equipment (e.g., via an L1 measurement report), that the user equipment is to be handed over to a target cell, and cause the user equipment to be handed over to (or perform some other mobility operation in respect of) the target cell in response to said determination. The handover and/or mobility operation may be performed utilizing the second timing advance value.

FIG. 14 illustrates operations that may be performed by an apparatus for a user equipment. The user equipment may be the user equipment mentioned above in relation to FIG. 13.

During 1401, the user equipment may obtain a first timing advance value for a target cell supported by a second access node, wherein the first timing advance value indicates a timing for transmitting uplink transmissions to the target cell. This obtaining may be performed in response to the first access node instructing the user equipment to obtain the first timing advance value. Any mechanism for obtaining a timing advance value for a cell may be used by the user equipment for obtaining the first timing advance value.

During 1402, the user equipment receives, an indication of when the first timing advance value will be invalid.

During 1403, the user equipment uses the indication of when the first timing advance value will be invalid to determine that the first timing advance value is or will soon be invalid.

During 1404, the user equipment signals, in response to said using, to a serving cell supported by a first access node, an indication that the first timing advance value is or will soon be invalid.

The user equipment may signal, to the serving cell, a first indication of a current strength and/or quality of a signal of the target cell received by the user equipment, wherein the first indication is received by the user equipment is signaled in a layer 1 measurement report.

The indication of when the first timing advance value will be invalid may comprise a timer value. In such a case, the user equipment may start a timer using the timer value (e.g., initialize a timer using the timer value such that the timer expires at a time duration correspondent to the timer value), and determine that the first timing advance value is or will soon be invalid in response to expiry of the timer.

The indication of when the first timing advance value will be invalid may be obtained prior to obtaining the first timing advance value. For example, the indication of when the first timing advance value will be invalid is provided in a configuration for lower layer triggered mobility (e.g., in an LLM configuration). The indication of when the first timing value will be invalid may be obtained when obtaining the first timing advance value.

The user equipment may receive, from the serving cell, an instruction to obtain a second timing advance value, the second timing advance value being obtained later in time than the first timing advance value, and obtain the second timing advance value in response to the instruction. The second timing advance value may be obtained using the same mechanism as was used for the obtaining the first timing advance value.

The user equipment may receive, from the serving cell, an instruction to release the first timing advance value, and release the first timing advance value in response to this instruction. The instructing may therefore cause the user equipment to release the first timing advance level while continuing to perform (and report to the first access node) measurements (e.g., layer 1 measurements) on the signal provided by the target cell.

Figure 15:
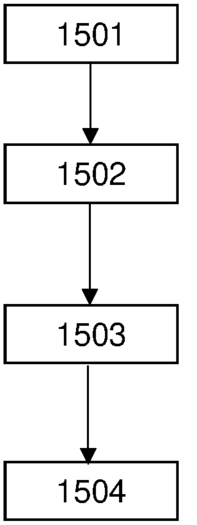

FIG. 15 illustrates operations that may be performed by an example user equipment.

During 1501, the user equipment may obtain a first timing advance value for a target cell supported by a second access node, wherein the first timing advance value indicates a timing for transmitting uplink transmissions to the target cell. This obtaining may be performed in response to the first access node instructing the user equipment to obtain the first timing advance value. Any mechanism for obtaining a timing advance value for a cell may be used by the user equipment for obtaining the first timing advance value.

During 1502, the user equipment receives, an indication of when the first timing advance value will be invalid.

During 1503, the user equipment uses the indication of when the first timing advance value will be invalid to determine that the first timing advance value is or will soon be invalid.

During 1504, the user equipment determines whether to autonomously initiate obtaining a second timing advance value for the target cell in dependence on the determination of whether the first timing advance value is or will soon be invalid, the second timing advance value being obtained later in time than the first timing advance value.

The user equipment may cause the determination of 1504 to be performed. For example, the user equipment may autonomously initiate the obtaining the second time value when it is determined that the first timing advance value is or will soon be valid.

The determining whether to autonomously initiate obtaining a second timing absence value may be further dependent on a current strength and/or quality of a signal of the target cell received by the user equipment. The current strength and/or quality may be measured by the user equipment. The current strength and/or quality may be measured (and/or reported to the first access node) in accordance with an LLM configuration applied at the user equipment.

The indication of when the first timing advance value will be invalid may comprise a timer value. In such a case, the user equipment may start a timer using the timer value (e.g., initialize a timer using the timer value such that the timer expires at a time duration correspondent to the timer value), and determine that the first timing advance value is or will soon be invalid in response to expiry of the timer.

The indication of when the first timing advance value will be invalid may be obtained prior to obtaining the first timing advance value. For example, the indication of when the first timing advance value will be invalid is provided in a configuration for lower layer triggered mobility (e.g., in an LLM configuration). The indication of when the first timing value will be invalid may be obtained when obtaining the first timing advance value. The indication of when the first timing advance value will be invalid may be provided in a configuration for lower layer triggered mobility.

The user equipment may determine to autonomously initiate obtaining the second timing advance value for the target cell when determining that the first timing advance value is or will be soon invalid, and obtain the second timing advance value in response to the determining to autonomously initiate the obtaining. The second timing advance value may be obtained using the same mechanism as was used for the obtaining the first timing advance value.

The user equipment may determine to not obtain second timing advance value for the target cell when a current strength and/or quality of a signal provided by the target cell is below or equal to a predetermined threshold, and releasing the first timing advance value in response to determining to not obtain the second timing advance value. This determination may therefore cause the user equipment to release the first timing advance level while continuing to perform (and report to the first access node) measurements (e.g., layer 1 measurements) on the signal provided by the target cell.

The determining whether to autonomously initiate obtaining a second timing advance value for the target cell may be further dependent on whether the user equipment has received, from the serving cell, an instruction to release the first timing advance value. For example, the user equipment may abstain from autonomously initiate obtaining the second timing advance value when the user equipment receives such an instruction. This instruction may further cause the user equipment to release the first timing advance level while continuing to perform (and report to the first access node) measurements (e.g., layer 1 measurements) on the signal provided by the target cell.

Figure 16:
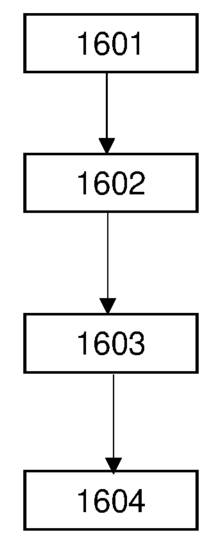

FIG. 16 illustrates operations that may be performed by an apparatus for a first access node. The first access node may be an entity that provides a user equipment with access to a network. The first access node may signal traffic to and/or from the user equipment. The first access node may be a distributed unit. The first access node may be a gNB.

During 1601, the first access node establishes a connection towards a user equipment via a serving cell supported by the first access node. In other words, the first access node may support a serving node serving the user equipment.

During 1602, the first access node receives configuration information comprising at least one indication of a duration of validity of timing advance values associated with a target cell supported by a second access node.

During 1603, the first access node may instruct the user equipment to obtain a first timing advance value for the target cell, wherein the first timing advance value indicates a timing for transmitting uplink transmissions to the target cell.

During 1604, the first access node monitors a validity of the first timing advance value using the duration of validity.

The first access node may determine that said monitoring indicates that the first timing advance value is or will soon be invalid. The first access node may determine, in response to said determining that the first timing advance value is or will soon be invalid, whether to instruct the user equipment to obtain a second timing advance value for the target cell, the second timing advance value being obtained later in time than the first timing advance value. The first access node may cause the decision of whether to instruct the user equipment into effect.

The determining whether to instruct the user equipment may comprise: receiving, from the user equipment, a first indication of a current strength and/or quality of a signal of the target cell received by the user equipment; and determining to instruct the user equipment to obtain the second timing advance value when the first indication indicates that the current strength and/or quality of the signal of the target cell received by the user equipment has increased above a predetermined threshold.

The determining whether to instruct the user equipment may comprise: receiving, from the user equipment, a first indication of a current strength and/or quality of a signal of the target cell received by the user equipment; and determining to instruct the user equipment to release the first timing advance value when the first indication indicates that the current strength and/or quality of the target cell received by the user equipment is below or equal to a predetermined threshold. The instructing may cause the user equipment to release the first timing advance level while continuing to perform (and report to the first access node) measurements (e.g., layer 1 measurements) on the signal provided by the target cell.

The first indication may be comprised in a layer one measurement report.

The indication of when the first timing advance value will be invalid may comprise a timer value. In such a case, the first access node may start a timer using the timer value (e.g., initialize a timer using the timer value such that the timer expires at a time duration correspondent to the timer value), and determine that the first timing advance value is or will soon be invalid in response to expiry of the timer.

The instructing the user equipment to obtain the first timing advance value may be performed in response to: receiving, from the user equipment, a layer 1 measurement report indicating that a strength and/or quality of a signal provided by the target cell is above a preconfigured threshold.

The first access node may determine, from a second indication of a current strength and/or quality of the target cell received from the user equipment (e.g., via an L1 measurement report), that the user equipment is to be handed over to a target cell, and cause the user equipment to be handed over to (or perform some other mobility operation in respect of) the target cell in response to said determination. The handover and/or mobility operation may be performed utilizing the second timing advance value.

The receiving configuration information may comprise receiving the configuration information from a centralized unit. The configuration information may be received when the user equipment is being configured with LTM (e.g., when the user equipment is being configured with a layer 1 measurement reporting configuration).

The presently described mechanisms may enable a UE to re-acquire the TA of a candidate target cell in advance of a potential handover to that candidate target cell. For example, the presently described mechanisms may enable the network to timely trigger the UE for re-acquiring the TA of a candidate target cell. The presently described techniques may reduce the likelihood of fallback to RACH resulting from an invalid/outdated TA of a candidate target cell, which may make the process more efficient.

It is understood that references in the above to a first network node, a first access node, a first network access node, a serving access node, a source access node, a serving DU, a source DU and the like are used interchangeably. These entities may comprise functionality supporting at least one cell facilitating transfer of traffic between a user equipment and a network. The first network node may e.g. be implemented as a network node that supports distributed unit, DU, functionality and/or a layer 2 protocol processing of a radio access network, RAN, a source DU, a serving DU, a serving gNB, a 5G gNB, a NR gNB, and/or a base station, which offers a broad applicability to different RAN implementation.

It is understood that references in the above to a second network node, a second access node, a second network access node, a target access node, a target DU, and the like are used interchangeably. These entities may comprise functionality supporting at least one cell that is able to facilitate transfer of traffic between a user equipment and a network. The second network node may e.g. be implemented as a network node that supports distributed unit, DU, functionality and/or a layer 2 protocol processing of a radio access network, RAN, a target DU, a target gNB, a 5G gNB, a NR gNB, and/or a base station, which again offers broad applicability to different RAN implementations. The first and the second network node could be the same of different nodes.

A third network node may e.g. be implemented as a network node that supports central unit, CU, functionality and/or a layer 3 protocol processing of a radio access network, RAN, a CU, a source CU, a serving CU, a source gNB, a 5G gNB, a NR gNB, and/or a base station. The third network node may control the first network node and/or the second network node. The first and the second network node may be controlled by the same third network node or by different third network nodes.

The user equipment may, e.g., be implemented as an apparatus or equipment that supports layer 2 and layer 3 protocol processing of a radio access network, RAN, a smartphone, and/or a mobile terminal.

To implement a method a UE and/or an access node may comprise specific means to perform specific functions/tasks. For example, to perform one or more of listed method steps above, a UE and/or access node may include establishing means, receiving means, determining means, obtaining means, transmitting, and/or monitoring means, etc., and/or an access node may include establishing means, receiving means, determining means, transmitting means, and/or monitoring means, etc. The specific means may be implemented using hardware and/or software, e.g. specific circuitry and/or specific computer program code.

The user equipment may comprise at least some of the components mentioned above in relation to FIG. 3. In addition to the above-mentioned at least one processor and at least one memory comprising computer code, the user equipment may comprise at least one of, for example, a user equipment may include in addition to at least a processor and a memory, e.g. at least one of: a transceiver, a transmitter, a receiver, antenna(s), radio frequency frontend, and/or baseband processor.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

As provided herein, various aspects are described in the detailed description of examples and in the claims. In general, some examples may be implemented in hardware or special purpose circuits, software code, logic or any combination thereof. For example, some aspects may be implemented in hardware, while other aspects may be implemented in firmware or software code which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software code, firmware code, special purpose circuits or logic, general purpose hardware or controller or other computing devices, or some combination thereof.

The examples may be implemented by computer software code stored in a memory and executable by at least one data processor of the involved entities or by hardware, or by a combination of software code and hardware.

The memory referred to herein may be of any type suitable to the local technical environment and may be implemented using any suitable data storage technology, such as semiconductor-based memory devices, magnetic memory devices and systems, optical memory devices and systems, fixed memory and removable memory.

The (data) processors referred to herein may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Further in this regard it should be noted that any procedures, e.g., as in FIG. 9, and/or FIG. 10, and/or FIG. 11, and/or FIG. 12, and/or FIG. 13, and/or FIG. 14, and/or FIG. 15, and/or FIG. 16, and/or otherwise described previously, may represent operations of a computer program being deployed by at least one processor comprised in an apparatus (where a computer program comprises instructions for causing an apparatus to perform at least one action, the instructions being represented as software code stored on at least one memory), or interconnected logic circuits, blocks and functions, or a combination of operations of a computer program being deployed by at least one processor comprised in an apparatus and logic circuits, blocks and functions. The software code may be stored on memory, such as physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multicore processor architecture, as nonlimiting examples.

Additionally or alternatively, some examples may be implemented using circuitry and/or means. The circuitry and/or means may be configured to perform one or more of the functions and/or method steps previously described. That circuitry and/or means may be provided in the access node and/or in the communications device and/or in a core network entity, and/or in a user equipment.

As used in this application, the term "circuitry" and/or "means" may refer to one or more or all of the following:

(a) hardware-only circuit implementations (such as implementations in only analogue and/or digital circuitry);

(b) combinations of hardware circuits and software code, such as:

(i) a combination of analogue and/or digital hardware circuit(s) with software/firmware code and (ii) any portions of hardware processor(s) with software code (including digital signal processor(s)), software code, and memory(ies) that work together to cause an apparatus, such as the communications device or base station to perform the various functions previously described; and (c) hardware circuit(s) and or processor(s), such as a microprocessor(s) or a portion of a microprocessor(s), that requires software code (e.g., firmware) for operation, but the software code may not be present when it is not needed for operation.

This definition of circuitry and/or means applies to all uses of this term in this application, including in any claims. As a further example, as used in this application, the term circuitry and/or means also covers an implementation of merely a hardware circuit or processor (or multiple processors) or portion of a hardware circuit or processor and its (or their) accompanying software and/or firmware code. The term circuitry and/or means also covers, for example integrated device.

Implementations of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The term "non-transitory," as used herein, is a limitation of the medium itself (i.e., tangible, not a signal) as opposed to a limitation on data storage persistency (e.g., RAM vs. ROM).

The scope of protection sought for various examples of the disclosure is set out by the independent claims. The examples and features, if any, described in this specification that do not fall under the scope of the independent claims are to be interpreted as examples useful for understanding the disclosure.

The foregoing description has provided by way of non-limiting examples a full and informative description of example implementations of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further implementation comprising a combination of one or more implementations with any of the other implementations previously discussed.

The invention claimed is:

1. An apparatus for a user equipment, the apparatus comprising:
 at least one processor; and
 at least one memory including computer program code,
 the at least one memory and the computer program code configured to, when is executed with the at least one processor, cause the apparatus at least to:
  obtain, in response to an instruction received from a first access node supporting a serving cell, a first timing advance value associated with a target cell supported by a second access node, the first timing advance value indicating a timing for transmitting uplink transmissions to the target cell;
  receive, from the first access node or the second access node, an indication of a validity time corresponding to the first timing advance value;
  initialize a timer based on the validity time, the timer defining a duration after which the first timing advance value is considered invalid;
  determine, upon expiry of the timer, that the first timing advance value is invalid;
  receive a release instruction from the first access node, wherein the release instruction is received in a medium access control element indicating that a timing advance group associated with the target cell is to be released; and
  based on determining that the first timing advance value is invalid:
   suppress transmission of an autonomous reacquisition request in response to the release instruction received from the first access node;
   determine, based on one or more layer-1 measurements of the target cell, that a signal quality of the target cell, represented by a reference-signal-received-power (RSRP), is below a predetermined threshold defined in a radio-resource-control reconfiguration message; and
 based on determining that the signal quality is below the predetermined threshold, release the first timing advance value without initiating reacquisition.

2. The apparatus of claim 1, wherein, upon determining that the signal quality is below the predetermined threshold, the apparatus refrains from initiating any random access procedure associated with the target cell.

3. The apparatus of claim 2, wherein the indication of the validity time is received within a radio resource control (RRC) reconfiguration message associated with a layer-1/layer-2 triggered mobility configuration.

4. The apparatus of claim 3, wherein determining that the first timing advance value is invalid comprises monitoring the expiry of the timer and comparing a remaining timer duration with a predefined warning interval.

5. The apparatus of claim 4, wherein the determining that the signal quality is below the predetermined threshold comprises measuring the RSRP or a reference signal received quality (RSRQ) of the target cell and comparing the measurement RSRP or RSRQ with the predetermined threshold.

6. The apparatus of claim 5, wherein the apparatus is further configured to transmit, to the first access node, a second indication that the first timing advance value is invalid prior to the expiry of the timer, the second indication causing the first access node to determine whether to instruct the user equipment to reacquire or release the first timing advance value.

7. The apparatus of claim 6, wherein the apparatus is further configured to restart the timer in response to receiving an updated validity time for the target cell from the first access node or the second access node.

8. The apparatus of claim 7, wherein the updated validity time is represented as a relative time offset measured from a time of transmission of the indication of the validity time.

9. The apparatus of claim 7, wherein the updated validity time is represented as an absolute time referenced to a system frame number of the serving cell.

10. The apparatus of claim 9, wherein the timer is initialized to expire at a time corresponding to the received relative time offset.

11. The apparatus of claim 10, wherein, upon the expiry of the timer, the apparatus is configured to generate a layer-1 measurement report identifying the target cell and a state flag indicating that the first timing advance value is invalid.

12. The apparatus of claim 11, wherein the apparatus is further configured to include, in the layer-1 measurement report, a last known reference-signal-received-power value for the target cell.

13. The apparatus of claim 12, wherein, upon releasing the first timing advance value, the apparatus clears any stored random-access configuration associated with the target cell.

14. The apparatus of claim 13, wherein the indication of the validity time originates from a centralized unit (CU) and is forwarded to the user equipment by a distributed unit (DU) associated with the first access node.

15. The apparatus of claim 14, wherein the indication of the validity time is generated by the second access node based on a locally maintained timing advance validity timer and is transmitted to the first access node prior to being forwarded to the user equipment.

16. The apparatus of claim 15, wherein the apparatus is configured to store, in association with the target cell, both a CU-provided validity time and a DU-provided validity time, and to initialize the timer based on a shorter one of the CU-provided and DU-provided validity times.

* * * * *